(12) United States Patent
Sekiya

(10) Patent No.: US 8,002,008 B2
(45) Date of Patent: Aug. 23, 2011

(54) CONVEYANCE SYSTEM HAVING IDENTIFICATION ATTACHING UNIT

(75) Inventor: Takuro Sekiya, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 607 days.

(21) Appl. No.: 11/961,628

(22) Filed: Dec. 20, 2007

(65) Prior Publication Data

US 2008/0156446 A1 Jul. 3, 2008

(30) Foreign Application Priority Data

Dec. 28, 2006 (JP) .................................. 2006-356578

(51) Int. Cl.
*B28B 19/00* (2006.01)
*B29C 65/00* (2006.01)
*B32B 37/00* (2006.01)

(52) U.S. Cl. ... 156/390; 156/538; 156/552; 156/DIG. 2; 156/DIG. 25; 156/DIG. 27

(58) Field of Classification Search .................. 156/213, 156/272.2, 277, 298, 384–388, 390, 538, 156/540–542, 552, DIG. 1, DIG. 2, DIG. 25, 156/DIG. 27, DIG. 58; 29/825, 832, 840, 29/846; 343/895

See application file for complete search history.

(56) References Cited

U.S. PATENT DOCUMENTS

| | | | | | |
|---|---|---|---|---|---|
| 2,761,545 | A | * | 9/1956 | Hoagland | 198/459.7 |
| 5,156,088 | A | * | 10/1992 | Tohdo | 101/35 |
| 5,427,029 | A | * | 6/1995 | Dumke | 101/484 |
| 6,147,662 | A | * | 11/2000 | Grabau et al. | 343/895 |
| 6,259,369 | B1 | * | 7/2001 | Monico | 340/572.8 |
| 6,758,000 | B2 | * | 7/2004 | Sandt et al. | 40/300 |
| 6,903,726 | B1 | * | 6/2005 | Bock | 345/166 |
| 7,118,034 | B2 | * | 10/2006 | Baldassari et al. | 235/383 |
| 7,353,598 | B2 | * | 4/2008 | Craig et al. | 29/846 |
| 2004/0226929 | A1 | * | 11/2004 | Miura et al. | 219/121.85 |
| 2005/0158456 | A1 | * | 7/2005 | Kiguchi et al. | 427/96.1 |
| 2005/0230478 | A1 | | 10/2005 | Chapman et al. | |
| 2008/0231419 | A1 | | 9/2008 | Mizukawa et al. | |

FOREIGN PATENT DOCUMENTS

| | | |
|---|---|---|
| DE | 102005041221 A1 | 3/2007 |
| EP | 1587019 A2 | 10/2005 |
| JP | 11-96326 | 4/1999 |
| JP | 2001-319567 | 11/2001 |
| JP | 2003-242472 | 8/2003 |
| JP | 2005-157917 | 6/2005 |
| JP | 2005-183801 | 7/2005 |
| JP | 2005/259054 | 9/2005 |
| JP | 2006-295878 | 10/2006 |
| KR | 1020060075129 | 7/2006 |

OTHER PUBLICATIONS

Jan. 18, 2010 European search report in connection with counterpart European patent application No. EP 07 25 5062.

* cited by examiner

*Primary Examiner* — Philip C Tucker
*Assistant Examiner* — Sing P Chan
(74) *Attorney, Agent, or Firm* — Cooper & Dunham LLP

(57) ABSTRACT

A conveyance system includes a conveying unit, an alignment unit, and an attaching unit. The conveying unit conveys objects, packaged by one or more package members, in a given direction. The alignment unit, disposed at a given position along a conveyance route of the conveying unit, aligns a positional orientation of the packaged objects to a reference position when the packaged objects are conveyed by the conveying unit. The attaching unit attaches at least one electronic functional device to each of the packaged objects.

17 Claims, 12 Drawing Sheets

CONVEYANCE SYSTEM HAVING IDENTIFICATION ATTACHING UNIT

TECHNICAL FIELD

The present disclosure relates generally to a conveyance system used for sorting and conveying products, and more particularly to a conveyance system for attaching given specific information to products.

DESCRIPTION OF BACKGROUND ART

A technological field of "printable electronics" has been increasingly researched and developed in recent years. Such printable electronics employs a given printing method or process for fabricating functional devices such as electronic device, in which a solution including organic or inorganic material, used instead of print ink, is applied on a substrate to form a functional device at a lower cost. Although electronic devices such as IC (integrated circuits), LSI (large-scale integration), or the like, have been fabricated with a conventional semiconductor manufacturing process, such conventional method may need relatively expensive equipment, which may be not preferable in some application fields.

Such printable electronics may employ a micro-contact printing method, an inkjet method, or the like, as printing process to fabricate electronic devices, including electronic circuits and others, on substrates. Such inkjet method has been increasingly used as another method for fabricating electronic devices (e.g., wiring pattern on substrate).

Further, an IC (integrated circuit) tag, having a small-sized IC chip storing specific information and antenna for wireless communication, has been increasingly researched and developed in recent years. Such IC tag may also be referred as wireless IC tag, wireless tag, RFID (radio frequency identification) tag, RF (radio frequency) tag, or the like. Such IC tag can be attached to products, delivery goods, commercial goods, or the like, to manage, control, or check relevant information of products or goods such as history information (e.g., used material, factory name, production date), delivery address information, or the like.

Although such IC tag may have such useful function for managing products, such IC tag may still have drawbacks on its cost performance because an IC chip included in IC tag may be manufactured by semiconductor manufacturing process using relatively expensive equipment. If such cost performance of IC tags may be enhanced, a uniform management system using IC tags may be conveniently used for industrial fields. For example, a logistic system used for sorting and delivering industrial or agricultural products may be effectively and efficiently conducted by attaching electronic functional devices having specific information on products or goods.

BRIEF SUMMARY

In an aspect of the present disclosure, a conveyance system including a conveying unit, an alignment unit, and an attaching unit is provided. The conveying unit conveys objects, packaged by one or more package members, in a given direction. The alignment unit, disposed at a given position along a conveyance route of the conveying unit, aligns a positional orientation of the packaged objects to a reference position when the packaged objects are conveyed by the conveying unit. The attaching unit attaches at least one electronic functional device to each of the packaged objects.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
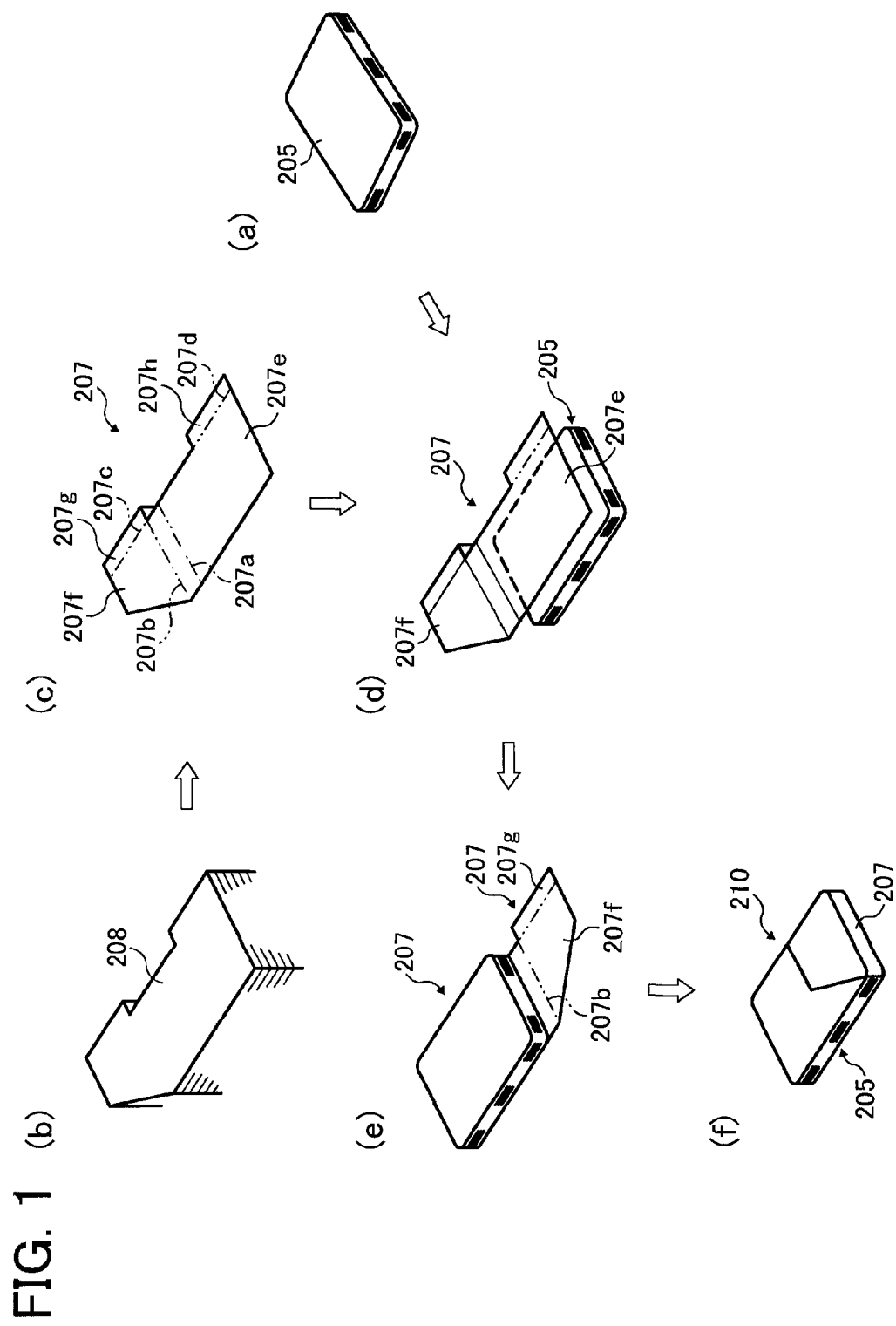
FIG. 1 illustrates an example of a process for packaging a product with a package member, according to an exemplary embodiment of the present disclosure.

The accompanying drawings are intended to depict examples and exemplary embodiments of the present invention and should not be interpreted to limit the scope of the present disclosure and the appended claims. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of examples and exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present disclosure and the appended claims. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Further, although in describing examples and exemplary embodiments shown in the drawings, specific terminology is employed for the sake of clarity, the present disclosure is not limited to the specific terminology so selected and it is to be understood that each specific element includes all technical equivalents that operate in a similar manner.

Figure 2:
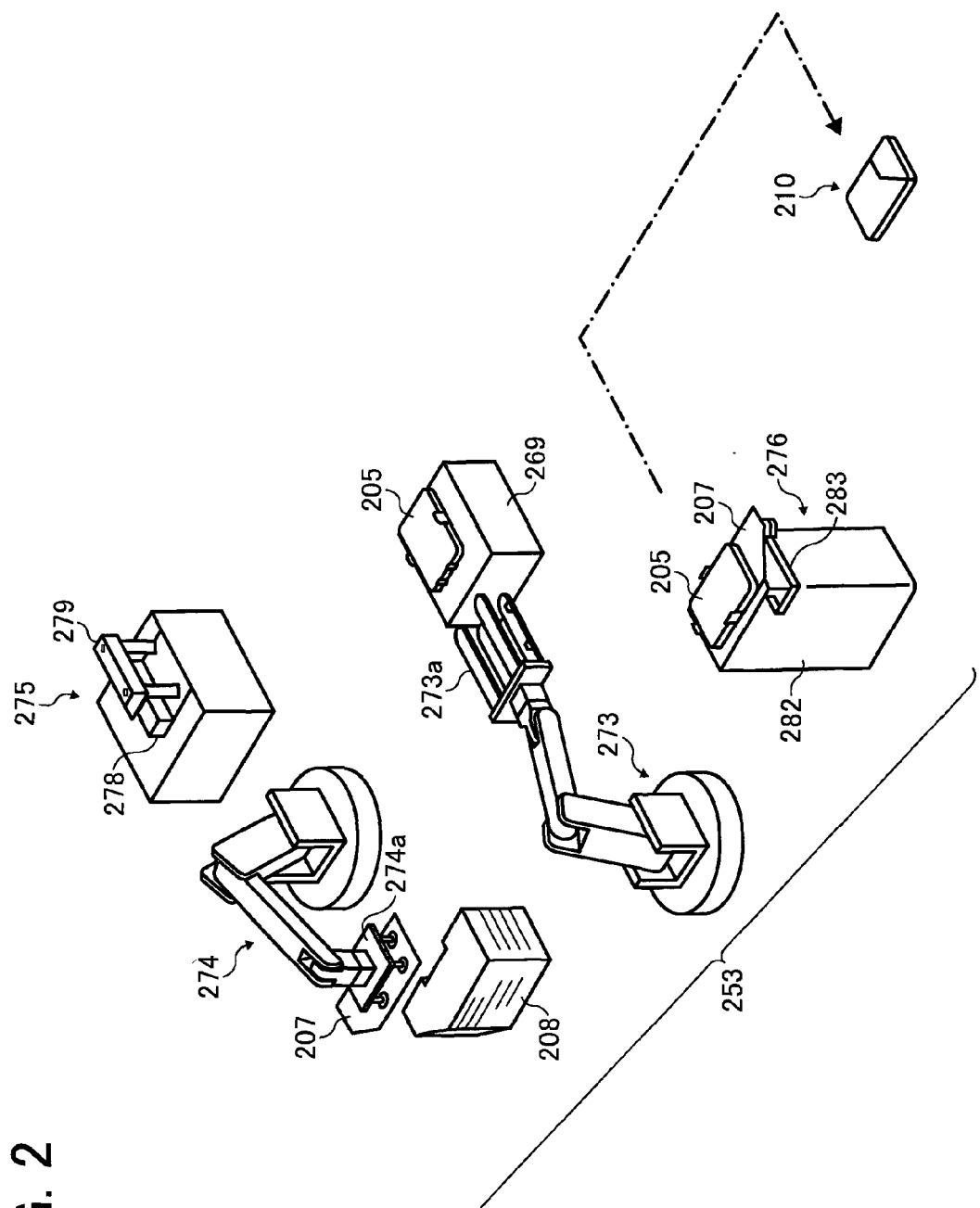
FIG. 2 illustrates an example of a mechanism that can be used for the packaging process of FIG. 1.
Figure 3:
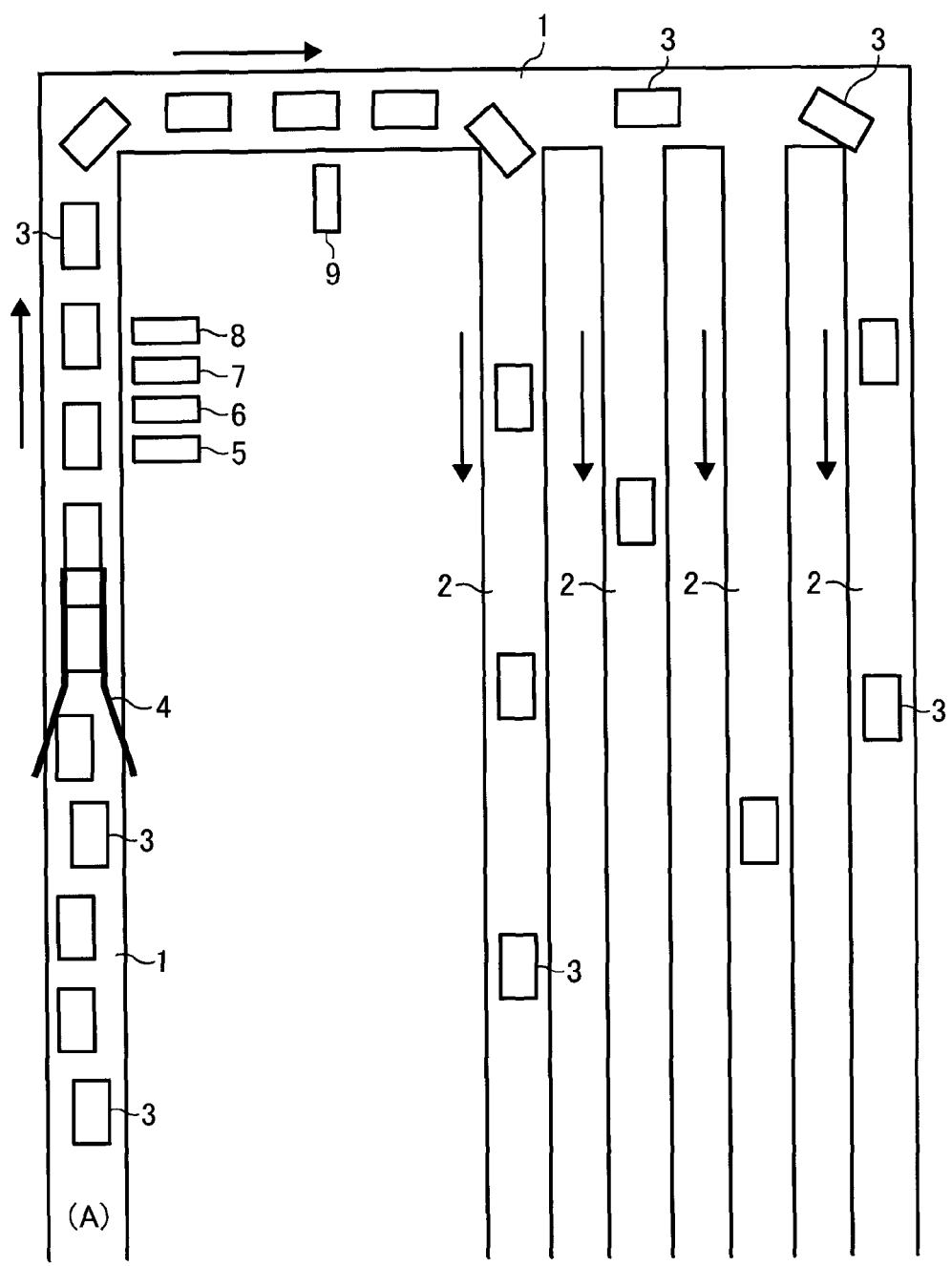
FIG. 3 illustrates a schematic view, of a conveyance system according to an exemplary embodiment of the present disclosure.

Referring now to the drawings, a method of packaging an object, such as a product, with a packaging member, according to an exemplary embodiment of the present disclosure, is described with particular reference to FIGS. 1 to 3.

FIG. 1 illustrates an example of a packaging process for packing an object with a given method. Such object may be an industrial product or goods, but not limited to these. In this disclosure, terms of "product" and "goods", or "product name and goods name", may be used interchangeably to indicate an object to be packed by a packaging process according to an exemplary embodiment of this disclosure. In FIG. 1, an electronic dictionary is used as an object to be packed by a packaging process according to an exemplary embodiment, for example.

FIG. 1 shows an electronic dictionary 205, a package member 207, a package substrate 208, and a packaged electronic dictionary 210. The package substrate 208 may be made, but not limited, of paper, for example. The package member 207 may have fold portions 207*a* to 207*d*, a lower protection face 207*e*, an upper protection face 207*f*, and flaps 207*g* and 207*h*, for example.

First, the electronic dictionary 205, shown in FIG. 1(*a*), manufactured in a factory is encased in the package member 207. The package member 207, shown in FIG. 1(*c*), may be prepared from the package substrate 208 prepared from a rectangular heavy sheet having cutout and modified corner portion, shown in FIG. 1(*b*). The package member 207 may have the above-mentioned fold portion 207*a* to 207*d* for folding the package member 207.

As illustrated in FIG. 1(*d*), the lower protection face 207*e* of the package member 207 is placed on the electronic dictionary 205, and the electronic dictionary 205 and the package member 207 are inverted as illustrated in FIG. 1(*e*). Then the upper protection face 207*f* of the package member 207 is folded and placed on the electronic dictionary 205, and the flaps 207*g* and 207*h* are further folded to protect side faces of the electronic dictionary 205, by which the packaged electronic dictionary 210 is prepared as illustrated in FIG. 1(*f*).

In an exemplary embodiment of the present disclosure, an electronic functional device, such as an IC chip, is attached to a package when the electronic dictionary 205 is packed. Such IC chip may be a chip formed on a silicon substrate, or may be a printable electronic functional device, which will be described later with reference to FIG. 3, in which a printable electronic functional device may be attached on a package of packaged products with a given printing method. Such electronic functional device may be a RFID (radio frequency identification) device (to be described later), for example. A RFID device includes an IC chip, integrated with a memory and an electronic circuit, and an antenna having wired shape having a length of several microns (μm) to several millimeters (mm), wherein such antenna may also be integrated in an IC chip. Hereinafter, terms and "electronic functional device" or "electronic device" are interchangeably used in this disclosure.

In an exemplary embodiment of the present disclosure, such electronic functional device may be firmly attached and fixed to a package with an adhesive agent such as resin type agent, for example, so that the electronic functional device cannot be removed from the package easily. For example, if someone tries to remove an electronic functional device from a package, the electronic functional device may be removed only when the package is destroyed. If an electronic functional device can be removed from a package easily, such electronic functional device may be stolen and data stored in the electronic functional device may be used in unauthorized manner (e.g., data leakage), which is not preferable. Although such device fixed condition may not completely prevent a theft of electronic functional device by breaking or destroying a package or a theft of packaged product itself, the above mentioned device fixing method may have some level of anti-theft effect of device or product, or may prevent some level of data leakage or tampering by theft, for example.

The IC chip can be made by any known methods. For example, an IC chip may be made on a silicon substrate, paper, paper based substrate, a plastic substrate, such as PET (polyethylene terephthalate) or the like, by applying a solution having electronic function materials, to be described later, with a given printing process such as jetting method, screen printing, or the like, on a substrate. Such printing process may preferably be used when a package substrate has some complex surface shape due to a shape of industrial or agricultural products. Because some substrates such as plastic substrate may have some flexibility, an IC chip can flex its shape corresponding to a shape of package.

Further, such printing process may not need relatively expensive equipment or facilities, and therefore fabrication cost of IC chip utilizing such process is lower. In general, such electronic functional devices may be discarded with packages when packaged products are delivered to destinations. Accordingly, such printing process, which may not need relatively expensive equipment or facilities, may be preferable to fabricate such electronic functional devices with reduced cost.

A description is now given to a packaging mechanism used for the above-described packaging process with reference to FIG. 2. As illustrated in FIG. 2, a packaging mechanism 253 may include a table 269, a robot arm unit 273 having a robot hand 273*a*, a package handling unit 274 having a pad 274*a*, a first folding unit 275 and a second folding unit 276, for example. The first folding unit 275 may include a fixed jig 278, and a movable jig 279, and the second folding unit 276 may include a base 282, and a fold arm 283, for example.

The electronic dictionary 205, manufactured in a factory, is conveyed and placed on the table 269, as illustrated in FIG. 2. The robot arm unit 273 picks up the electronic dictionary 205 from the table 269. The package handling unit 274 holds the package member 207 with the pad 274a. The first folding unit 275 bends the package member 207 at its each folding portion. The second folding unit 276 packs the electronic dictionary 205 in the package member 207 by folding each folding portion of the package member 207.

The robot arm unit 273 and the package handling unit 274 have an articulated robot arm having a multi-axial joint. The robot arm unit 273 has the robot hand 273a used for grasping the electronic dictionary 205 and the package member 207. The package handling unit 274 has an arm having the pad 274a used for sucking and holding the package member 207. The robot arm unit 273 and the package handling unit 274 are used to place the electronic dictionary 205 on the lower protection face 207e of the package member 207, and then transport the electronic dictionary 205 and the package member 207 to the second folding unit 276.

The first folding unit 275 includes the fixed jig 278, the movable jig 279 movable along an end face of the fixed jig 278, and a move mechanism (not shown) for moving the movable jig 279 in upward/downward direction. The first folding unit 275 is used to bend the package member 207 at the fold portions 207a to 207d.

The second folding unit 276 includes the base 282, which places the electronic dictionary 205 overlaid with the package member 207, the fold arm 283 for folding the upper protection face 207f of the package member 207 onto the electronic dictionary 205, and a pivot mechanism (not shown) for pivoting the fold arm 283. On the second folding unit 276, the upper protection face 207f of the package member 207 is folded onto the electronic dictionary 205 along the fold portion, and the flaps 207g and 207h are also folded onto side faces of the electronic dictionary 205, by which the packaged electronic dictionary 210 is prepared.

The package member 207 may be prepared from the package substrate 208 stocked in advance for mass production of products. Although the package member 207 is prepared from the package substrate 208 by using the packaging mechanism 253 when the electronic dictionary 205 is conveyed, such package member 207 can be prepared and stocked in advance of the conveyance of the electronic dictionary 205.

Such packaged electronic dictionary 210 may then be conveyed to a product sorting system shown in FIG. 3. Specifically, packaged products (e.g., packaged electronic dictionary 210) may be conveyed to a position (A) in FIG. 3, and then sorted by a product sorting system. After such sorting process, packaged products are handled by a logistic system to deliver products to the market (e.g., retail store/customer). Although an industrial product is used for describing a packaging process according to an exemplary embodiment of the present disclosure, such packaging process can be applied to any products in any business field.

A description is now given to such product sorting system with reference to FIG. 3. Such product sorting system may include a first conveyance belt 1, a second conveyance belt 2, packaged products 3, a guide member 4, a pretreatment unit 5, a jet head 6, a dry unit 7, a covering agent attaching unit 8, and an information writer/reader 9, for example.

In such product sorting system, the packaged products 3 are conveyed on the first conveyance belt 1 in a direction shown by an arrow. During such conveyance, the guide member 4 corrects or controls a position of the packaged products 3 on the first conveyance belt 1 at a given position with a higher precision. After such positional correction or alignment of the packaged products 3, an electronic functional device is formed on each of the packaged products 3 by the jet head 6. Then, the information writer/reader 9 writes data specifically assigned to each electronic functional device, formed on each of the packaged products 3, and the information writer/reader 9 may be also used for reading such data.

After reading such data, the packaged products 3 are conveyed from the first conveyance belt 1 to the second conveyance belt 2, having a plurality of lines, while sorting packaged products 3 depending on information stored in the electronic functional device. Such sorted packaged products 3 are then transported to a given destination based on delivery address information stored in the electronic functional device, for example.

The pretreatment unit 5 is used to set a surface of packaged products 3 at a preferable condition for receiving a solution including electronic function material, to be jetted to such surface from the jet head 6, so that a given pattern can be fabricated on each of the packaged products 3 with a high precision. However, such pretreatment process can be omitted if the packaged products 3 have a surface condition preferable for fabricating electronic functional devices thereon.

The dry unit 7 (e.g., heater, lamp) is used to vaporize a solvent included in a solution having electronic function material so that solid content (i.e., electronic function material) can be deposited on the packaged products 3, by which a given pattern having electronic function can be formed on the packaged products 3.

The dry unit 7 may use a halogen heater as a heat source and a reflector for reflecting heat energy generated by the halogen heater, for example. When such reflector is provided, generated heat energy can be effectively used for drying a solution. The reflector may be made of aluminum alloy having good luminance, and shaped in a parabolic shape, for example. Such parabolic shaped reflector may reflect heat energy of the halogen heater effectively, by which such heat energy can be effectively used for drying a solution. The heat source may be a halogen lamp, sheathed heater, a ceramic heater, a thermistor, or the like, in addition to a halogen heater, for example. Further, the dry unit 7 may include a lens, for example, in which light coming from a light source can be focused on a surface applied with a solution. Further, the dry unit 7 may include a reflector and a lens, for example, in which light and heat may be effectively used for drying a solution efficiently.

Alternatively, the dry unit 7 may be a hot air unit, which blows hot air on the packaged products 3 to vaporize a solvent of a solution so that solid content is deposited on packaged products 3. Such hot air unit may include a blow unit, a heat unit, and a hot air blowing port, for example. The blow unit may be a fan, a pump, a compressor, or an accumulator combined with these units. The heat unit may be a heating element made of nichrome wire, a halogen lamp, a sheathed heater, a ceramic heater, or the like.

The dry unit 7 may be disposed at a position along a conveyance belt, which can dry a solution applied on the packaged products 3 effectively. Although the dry unit 7 may be disposed at a side position of the first conveyance belt 1 in FIG. 3 to conduct a drying process to a side face of the packaged products 3, the dry unit 7 may be disposed at another position. For example, if the jet head 6 jets a solution on an upper side of the packaged products 3, the dry unit 7 may be disposed over an upper position of the first conveyance belt 1.

Further, the dry unit 7 may not need to dry each of the packaged products 3 as a whole but the dry unit 7 may preferably dry only a local surface area applied with a solution on each of the packaged products 3. For example, if the packaged products 3 are fresh foods, vegetables, etc., a local drying process is preferable because such foods may be degraded by heat. Further, a local drying process is preferable from a viewpoint of energy saving. Further, if air-drying can be employed, the dry unit 7 can be omitted.

The packaged products 3, conveyed on the first conveyance belt 1 may be industrial products or agricultural crops packed in a package such as paper sheet, corrugated cardboard, resin film/sheet, or a mail articles and delivery goods, for example. Such package (or package member) may or may not cover the content in the packaged products 3 entirely. As long as the package member can function for encasing and protecting content during a delivery process (e.g., truck transport), such package can be used without problems, even if some content may not be covered by the package.

As mentioned above, an electronic functional device is formed on the packaged products 3 with the jet head 6 using an inkjet method, in which the jet head 6 jets a solution including electronic function material to a surface of packaged products 3. The electronic functional device may be a RFID device, for example. The RFID device is then written with given specific information by the information writer/reader 9. For example, if the packaged products 3 are agricultural products, data of weight, growing country/area, delivery address information, delivery date, or the like, for example, may be written to such RFID device.

Such data stored in the RFID device formed on the packaged products 3 is then read by the information writer/reader 9, and each of the packaged products 3 are conveyed from the first conveyance belt 1 to the second conveyance belt 2, having a plurality of lines, while sorting each of the packaged products 3 depending on information stored in the electronic functional device. Such sorted packaged products 3 are then transported to given destinations based on delivery address information stored in the electronic functional devices.

Although the information writer/reader 9, in one example, may include an information writer and an information reader integrally, an information writer and an information reader in another example may be separately provided. Further, similar to the dry unit 7, the information writer/reader 9 can be disposed at any position with respect to the conveyance belt as long as the information writer/reader 9 can write or read information of the electronic functional device. For example, the information writer/reader 9 can be disposed at a side position, an upper position, etc., of the conveyance belt in an exemplary embodiment of the present disclosure.

Although an electronic functional device can be formed on a surface of a package (or package member) of packaged products by using the jet head 6 after products are packaged as described above, such electronic functional device can be formed on a surface of a package member at another timing. For example, if such electronic functional device is formed on a package member by known methods such as printing, or if such electronic functional device such as an IC chip is attached on a package member before the packaging process shown in FIGS. 1 and 2 is conducted, the jet head 6 can be omitted from the product sorting system shown in FIG. 3.

As above-described with FIG. 3, electronic functional devices can be formed on packaged products using the jet head 6 on an on-demand basis, if such on-demand device forming is preferable. Further, if package members are formed with electronic functional devices thereon before conducting a packaging process, such package members having electronic functional devices can be prepared with a reduced cost with an effect of mass scale production and printing of package members, which may be preferable.

Figure 4A:
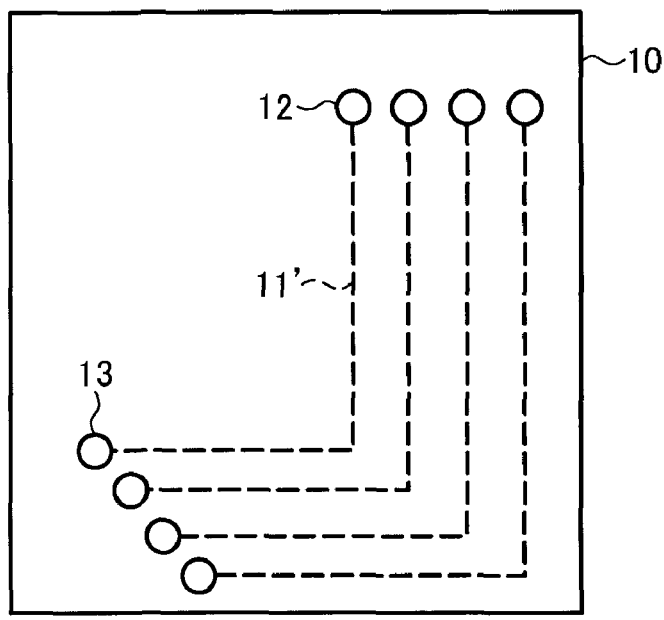
FIGS. 4A and 4B illustrate an example of a wiring pattern formed by jetting a solution with a jet head, according to an exemplary embodiment of the present disclosure.
Figure 4B:
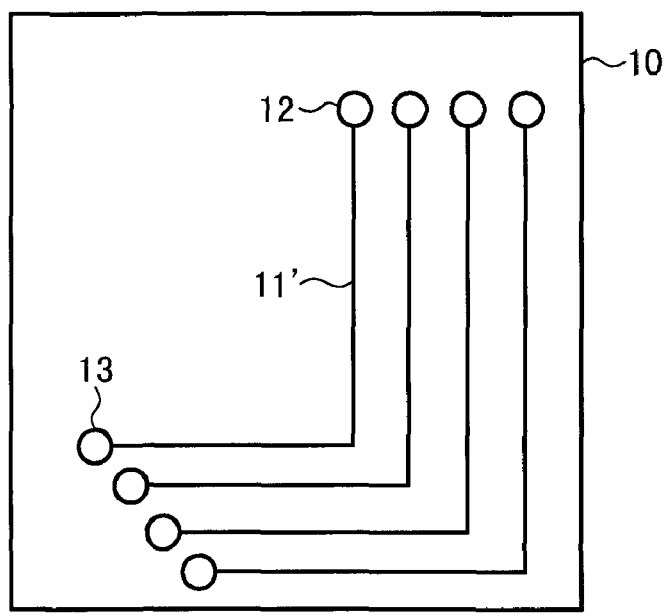

A description is now given to a pattern formed on a surface of a package (or package member) with reference to FIGS. 4A and 4B. FIGS. 4A and 4B illustrate an example of a pattern, having electrical function, formed on a substrate 10, made of paper or the like, by using the jet head 6 employing a liquid jetting method according to an exemplary embodiment of the present disclosure. FIG. 4A shows a state that terminals 12 and 13 are formed on the substrate 10, in which a dotted portion 11' indicates an area where a wiring pattern is to be formed. FIG. 4B shows a state that a wiring pattern 11 is formed on the substrate 10 by dispensing a solution including electronic function material by the liquid jetting method. The electronic function material may be fine particles having conductivity, for example.

A description is now given to an inkjet technique used in an exemplary embodiment of the present disclosure. In an exemplary embodiment, an inkjet technique is used to form an electronic device or electronic function device, to be described later, on a surface of the packaged product 3. In order to form an electronic device with a higher precision, a positional relationship of the packaged products 3, conveyed on the first conveyance belt 1, and the jet head 6 may need to be adjusted with a higher precision.

In an exemplary embodiment of the present disclosure, such positional relationship of the packaged products 3 and the jet head 6 can be adjusted by using the guide member 4 shown in FIG. 3. As illustrated in FIG. 3, the packaged products 3 placed on the position (A) are conveyed on the first conveyance belt 1 without aligning a package orientation of the packaged products 3. For example, some packages may be positioned closer to a right side of the first conveyance belt 1, and some packages may be positioned closer to a left side of the first conveyance belt 1 until the packages are conveyed to the guide member 4. However, when the packaged products 3 pass through the guide member 4, the packaged products 3 are guided by an angled-entry-portion and then further guided by a parallel wall portion of the guide member 4, by which a package orientation of the packaged products 3 on the first conveyance belt 1 may be aligned. As such the guide member 4 may be used as alignment unit for positioning packaged products 3 on the first conveyance belt 1 at a given reference position.

Accordingly, when the packaged products 3 pass through a position facing the jet head 6, a distance between the packaged products 3 and the jet head 6 may be maintained at a given desired level. For example, a distance between the packaged products 3 and the jet head 6 may be set to a range of 0.3 mm to 3 mm, for example, wherein such distance range may be determined based on factors such as jet head type. The jet head 6 (as droplet applicator) may employ any mechanism, that can dispense a given amount of droplet. For example, the jet head 6 may preferably employ an inkjet mechanism, which is capable of dispensing droplet ranging from 0.1 pl (pico liter) to several hundreds of pl (pico liter).

In inkjet method, an electrical signal is applied to a piezoelectric vibrator so as to convert the electrical signal into mechanical vibration of the piezoelectric vibrator, which causes a droplet to be dispensed from a nozzle. Such method is generally known as a drop-on-demand method.

In another method, a droplet of a recording fluid containing a controlled amount of electrostatic charge is produced using a continuous vibration generating technique. The produced droplet of the recording fluid flies between polarizing electrodes applied with a uniform electric field so as to reproduce images on a recording member. This is generally called the continuous flow method, or charge control method.

Further, in another method, air bubbles are generated in fluid, and the bubbles act on the fluid so as to cause a droplet to be dispensed from a nozzle. This technique is generally called a thermal inkjet method or Bubble Jet (registered trademark) method.

A user can select any one of drop-on-demand method, continuous flow method, and thermal inkjet method, in accordance with need.

Next, the jet head unit 6 according to an exemplary embodiment of the present disclosure is described with reference to FIGS. 5A, 5B, and 6. As illustrated in FIG. 6, the jet head unit 6 may have seven nozzles, for example.

Figure 5A:
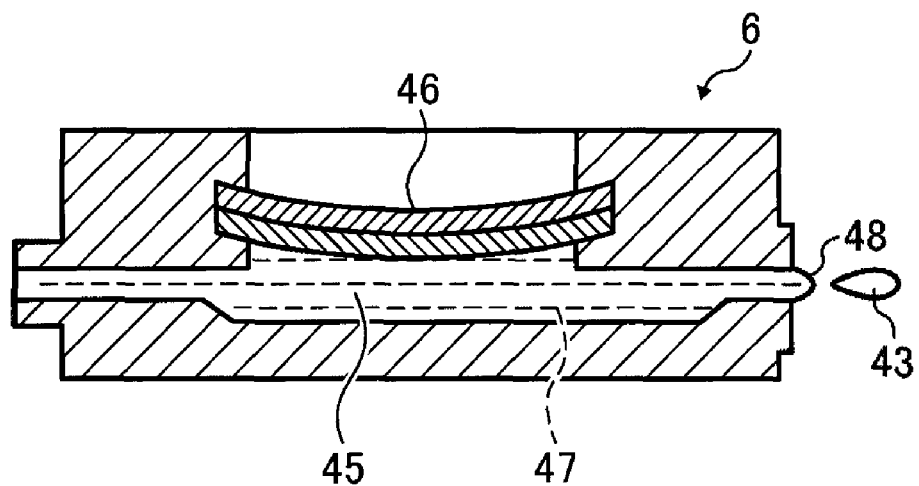
FIGS. 5A and 5B illustrate a jetting process of a jet head utilizing a piezoelectric element.
Figure 5B:
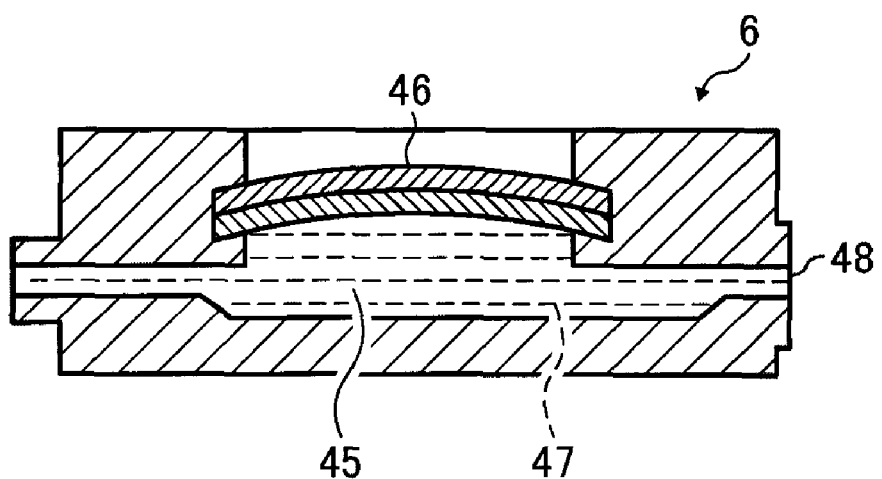
Figure 6:
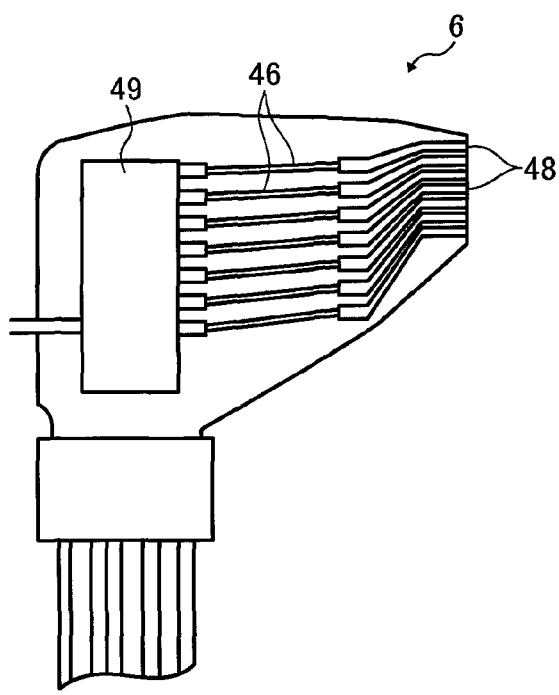
FIG. 6 illustrates an exemplary structure of a jet head utilizing a piezoelectric element.

As illustrated in FIGS. 5A and 5B, the jet head 6 includes a piezoelectric element 46 and a chamber 45, and a nozzle 48, for example. The piezoelectric element 46 generates and applies vibration energy to the chamber 45, which stores solution 47, to dispense a droplet 43 from the nozzle 48. Specifically, a pulse signal is applied to the piezoelectric element 46 to deform the piezoelectric element 46 as shown in FIG. 5A, by which a capacity of the chamber 45 is reduced and a pressure wave occurs in the chamber 45. Such pressure wave causes the droplet 43 to be dispensed from the nozzle 48. FIG. 5B illustrates a state where the piezoelectric element 46 returns to its original shape, by which the capacity of the chamber 45 is increased.

Figure 7:
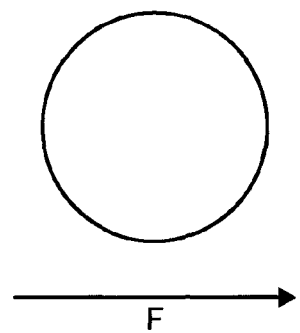
FIG. 7 illustrates an exemplary shape of a flying droplet dispensed from the jet head of FIG. 6.
Figure 8:
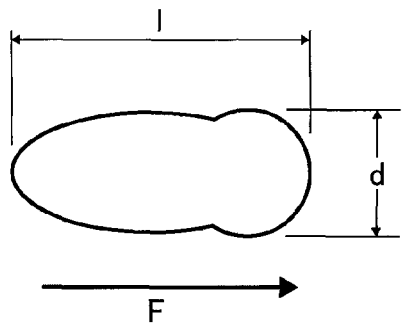
FIG. 8 illustrates another exemplary shape of a flying droplet dispensed from the jet head of FIG. 6.

When the droplet 43 is dispensed from the jet head 6, the droplet 43 may have a shape as shown in FIG. 7 or FIG. 8, wherein the droplet 43 is dispensed by a force generated by the piezoelectric element 46, which is generated by converting electric power to mechanical displacement. Specifically, a flying droplet may have a substantially circular shape as shown in FIG. 7, or a pillar-like shape extending in a flying direction shown by an arrow F in FIG. 8. Such flying droplet shown in FIG. 8 may have a circular portion having a diameter of d, and a length L as a whole, in which the length L may be within three times of the diameter d.

When a droplet is jetted from a nozzle of a jet head with an effect of a piezoelectric element, which converts electric energy to mechanical displacement, a shape of droplet may be determined based on a pressure force applied to a solution (e.g., liquid) from the piezoelectric element, in which the pressure force may have differential values over time. When such jet head employing a piezoelectric element is used for jetting a droplet with a given condition (e.g., drive pulse voltage), a jetted droplet may have a substantially circular shape, or a pillar-like shape having a circular portion, in which a length of jetted droplet is within three times of a diameter of the circular portion as shown in FIGS. 7 and 8. In such condition, such jetted droplet may fly stably without receiving disturbances, in which a flying speed of droplet may be in a range of 5 m/s to 12 m/s, for example.

In an exemplary embodiment of the present disclosure, such jet head 6 may be used to dispense a solution including electronic function material on a substrate for forming a wiring pattern or an electronic device under such condition that a flying droplet has a shape shown in FIG. 7 or FIG. 8. If a dispensing condition of the jet head 6 deviates from such desired condition shown in FIG. 7 or FIG. 8, an adjustment process may be performed as follows. Specifically, a solution including electronic function material or an equivalent liquid (in terms of viscosity, surface tension) is jetted from a jet head, and a shape of jetted solution (or flying droplet) is observed with a microscope. Then, a drive pulse, applied to a piezoelectric element, is adjusted to adjust a shape of flying droplet to a desired shape shown in FIG. 7 or FIG. 8. Based on such adjustment process, an adjusted drive pulse signal is set for driving the piezoelectric element of the jet head 6 to dispense a droplet having the above-described desired shape, in which such adjusted drive pulse signal may be determined by setting a given value to pulse voltage, pulse time, and pulse waveform. A microscope may be configured with a light source such as light emitting diode (LED) having flashing light function to observe a shape of jetted solution (or flying droplet), for example.

As also illustrated in FIG. 6, the solution 47 is introduced into the chamber 45 through a filter 49, which may be provided within the jet head 6 to devise a filtering function at a given location proximity of the nozzle 48. Such filter 49 can trap foreign particles having a size greater than that of conductive fine particles or nanoparticles in a solution, to prevent deterioration of functionality of a wiring pattern or an electronic device formed on a substrate. Such filter 49 can be manufactured in compact size and simple structure, by which the jet head 6 can be embedded with the filter 49 therein as shown in FIG. 6, by which the jet head 6 having the filter 49 can also be manufactured in compact size.

Preferably, the filter 49 may be made of a material such as stainless mesh or resin material such as polytetrafluoroethylene or Teflon (registered trademark) and polypropylene, for example. In other words, the filter 49 should be made of a material having effective anti-corrosion to a solution used in an exemplary embodiment of the present disclosure. Further, the filter 49 may have a mesh size (or pore size), which can trap foreign material (or foreign particles) having a size, which is 30 times or greater than a diameter of fine particles in a solution.

Specifically, a solution containing fine particles (used as electronic function material) having a diameter of 0.0001 μm to 0.2 μm (0.1 nm to 200 nm) is used, and more preferably, a solution containing fine particles having a diameter of 0.0001 μm to 0.05 μm (0.1 nm to 50 nm) is used in an exemplary embodiment of the present disclosure. Accordingly, if the filter 49 may have a mesh size (or pore size), which can trap foreign material having a size of 0.003 μm to 0.6 μm, more preferably 0.003 μm to 1.5 μm or greater, the filter 49 can trap such foreign material having such size effectively, and thereby the nozzle 48 may not be clogged by foreign material. Generally, a filtering performance (or removal performance) of a filter may be measured in absolute removal rate or average removal rate. In an exemplary embodiment, the filter 49 may have a mesh size (i.e., size of foreign material that can be trapped) determined based on absolute removal rate.

Although FIG. 6 shows a configuration that the filter 49 is embedded in the jet head 6, the filter 49 is not required to be embedded in the jet head 6. Further, it should be noted that a plurality of filters can be disposed for the jet head 6. If a plurality of filters is disposed, one filter located at a position nearest to the nozzle 48 may have a mesh size described above, to effectively filter or remove foreign material in a solution. Such filter 49 can similarly be provided to other jet head, using a thermal method or bubble method, to be described later, in addition to the above-described jet head using a piezoelectric element, which converts electric energy to mechanical displacement.

Figure 9A:
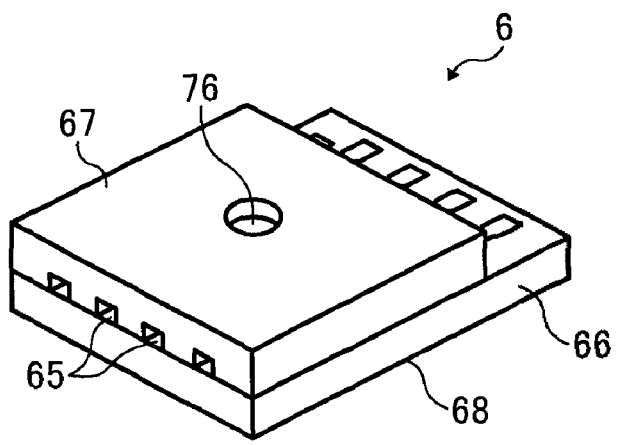
FIGS. 9A, 9B, and 9C illustrates an example of a jet head of a thermal type.
Figure 9B:
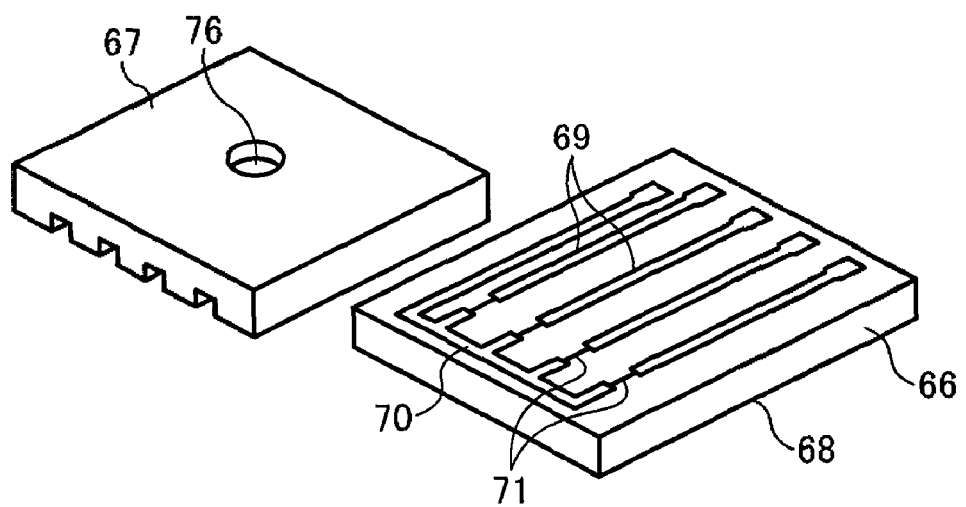
Figure 9C:
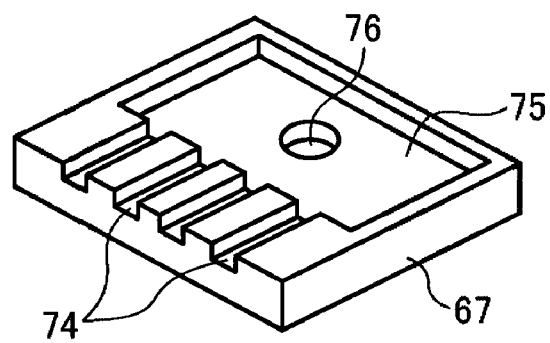

Next, another jet head is described with reference to FIGS. 9A to 9C. FIGS. 9A to 9C illustrate a jet head 6 using bubble method, in which a bubble is generated instantaneously in liquid by heating liquid to a higher temperature (e.g., 300 to 500 degrees Celsius) in a short period of time (e.g., 1 μs to 10 μs), and then a droplet is jetted from a nozzle with an effect of such bubble. For example, such jet head is called edge-shooter type, which jets droplets from an end portion of a liquid chamber. The jet head 6 shown in FIG. 9A has four nozzles, for example. Such jet head 6 can be manufactured by coupling a thermal element unit 66 and a cover unit 67. The thermal element unit 66 has an individual electrode 69, a common electrode 70, and a heating element 71, which are formed on a silicon substrate 68 by a wafer process.

As illustrated in FIG. 9C, the cover unit 67 has grooves 74, and a recess 75, for example. The grooves 74 become channels for guiding solution containing a functional material, and the recess 75 configures a common fluid chamber for containing solution, which is to be guided through the grooves 74. The cover unit 67 is combined with the thermal element unit 66, as shown in FIG. 9A, to form the above-mentioned channels and the common fluid chamber. When the thermal element unit 66 and the cover unit 67 are coupled with each other, the heating element 71 is positioned at a position corresponding to the channels. In such configuration, nozzles 65 are formed at the ends of the channels, from which a droplet of solution is dispensed. Although the shape of the nozzles 65 is formed in a rectangular shape in the example of FIGS. 9A to 9C, the shape of the nozzles 65 may be formed in a circular shape in another example.

With a consideration of stability of droplet jetting process, a nozzle plate may be provided on the nozzle 65 to set a desired nozzle diameter and a desired nozzle shape (e.g., circular shape). Such nozzle plate may be made of a material, such as Ni, and formed with higher precision by using an electroforming technique, for example. Alternately, a nozzle plate having nozzle holes may be formed by performing an excimer laser process on a resin film (substrate), for example. In addition, a solution inlet port 76 can be formed in the cover unit 67 to allow supply of solution into the solution supply chamber using a supply unit (not shown).

Figure 10:
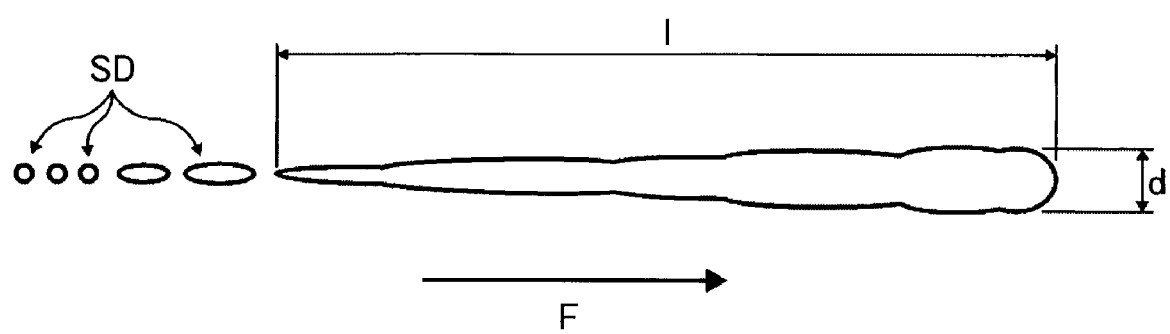
FIG. 10 illustrates an exemplary shape of a flying droplet dispensed from the jet head of FIG. 9A.

When the droplet 43 is dispensed from the jet head 6 shown in FIG. 9A to 9C, the droplet 43 may have a shape shown in FIG. 10, wherein the droplet 43 is dispensed by a force of a bubble generated with an effect of heat generated by a heating element. Specifically, a flying droplet may have a substantially pillar-like shape extending in a flying direction shown by an arrow F in FIG. 10. Such pillar-like shape includes a circular portion having a diameter d and a length L as a whole, in which the length L may be five times or greater than the diameter d.

When a droplet is jetted from a nozzle of a jet head by a bubble method, which uses a force of a bubble generated with an effect of heat from a heating element, a shape of droplet may be determined based on a force applied to a solution (e.g., liquid) by the bubble.

Compared to a jet head using a piezoelectric element for jetting a droplet, a jet head using bubble method can jet droplet with a higher pressure, by which a flying speed of droplets becomes relatively greater, such as 8 m/s to 18 m/s, for example. When such jet head employing a heating element is used for jetting a droplet with a given condition, a jetted droplet may have a substantially pillar-like shape having a circular portion, in which a length of jetted droplet is five times or greater than a diameter of the circular portion, and having satellite droplets SD as shown in FIG. 10. Because such satellite droplets SD may also fly at a greater flying speed, the satellite droplets SD may impact on a position on a substrate which has already been impacted by a pillar-like shape portion of droplet, and a wiring pattern or an electronic device can be formed on substrate correctly.

In an exemplary embodiment of the present disclosure, such jet head 6 may be used to dispense a solution including electronic function material on a substrate for forming a wiring pattern or an electronic device under such condition that a flying droplet has a shape shown in FIG. 10. If a dispensing condition of the jet head 6 deviates from such desired condition shown in FIG. 10, an adjustment process may be performed as follows. Specifically, a solution including electronic function material or an equivalent liquid (in terms of viscosity, surface tension, etc.) is jetted from a jet head, and a shape of jetted solution (or flying droplet) is observed with a microscope. Then, a drive pulse, applied to a heating element, is adjusted to adjust a shape of a flying droplet to a desired shape, such as shown in FIG. 10. Based on such adjustment process, an adjusted drive pulse signal is set to a fabrication apparatus of an exemplary embodiment and applied to a heating element of a jet head to dispense a droplet having the above-described desired shape, in which such adjusted drive pulse signal may be determined by setting a given value to pulse voltage, pulse time, and pulse waveform. For example, a pulse voltage or pulse time (or width) is incrementally increased to set a desired shape of droplet.

In an exemplary embodiment of the present disclosure, a plurality of droplets are applied to a substrate to form an electronic device or a wiring pattern. Accordingly, if a jet head having multiple nozzles is used, an electronic device or a wiring pattern can be formed on a substrate efficiently (e.g., in a shorter time). Although the jet head 6 shown in FIG. 9 includes four nozzles, the number of nozzles can be adjusted to any given number to enhance pattern forming efficiency. However, if the number of nozzles is increased too great, a manufacturing cost of a jet head may be undesirably increased and nozzles may clog with a higher probability. Accordingly, the nozzle number of nozzles in a jet head may be determined based on consideration of several factors, such as apparatus manufacturing cost, apparatus manufacturing efficiency, or the like.

Figure 11:
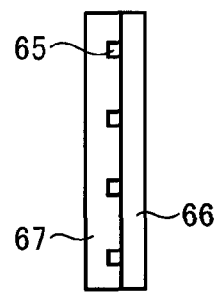
FIG. 11 illustrates a multi-nozzle type jet head, viewed from a nozzle side.
Figure 12:
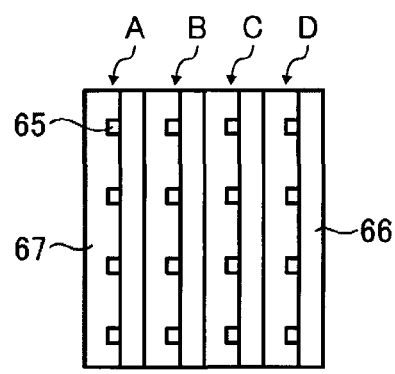
FIG. 12 illustrates multi-nozzle type jet heads, stacked one on the other.
Figure 13:
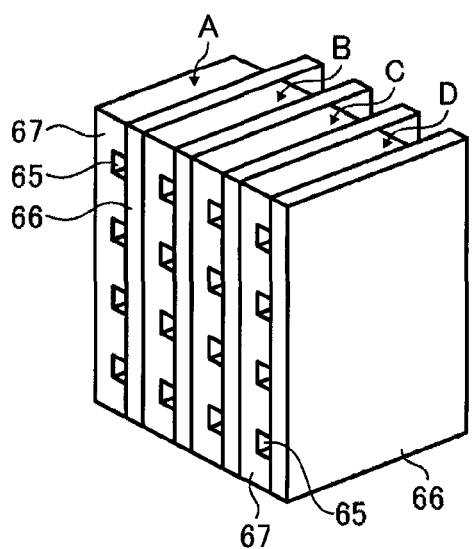
FIG. 13 illustrates a perspective view of the multi-nozzle type jet head of FIG. 12.

FIG. 11 illustrates a jet head having multiple nozzles viewed from the nozzle 65. As illustrated in FIGS. 12 and 13, such jet head having a multiple-nozzle array may be provided as a jet head assembly, and such jet head assembly may be used to dispense different kinds of solution from different nozzle array. Specifically, as illustrated in FIGS. 12 and 13, a jet head assembly includes jet heads A, B, C, and D, for example. Each of the jet heads A, B, C, and D includes nozzles 65. Solutions containing different kinds of compounds (e.g., electronic function material, conductive fine particles, nano-particles, etc.) can be dispensed from the nozzles 65 of the respective jet heads A, B, C, and D.

In general, when an electronic device or the like is to be formed by using such jet head, the jet head may need to move over packaged products in a relative manner. For example, an inkjet printer can have a carriage for carrying a jet head, in which the carriage may reciprocally move in a first direction over a recording sheet, and the recording sheet may move in a second direction perpendicular to the first direction when one line image is formed on the recording sheet step by step. With such process using relative movement of the jet head and the recording sheet, a two-dimensional image can be form on the recording sheet, for example.

In the exemplary embodiment of FIG. 3, the packaged products 3 are conveyed on the first conveyance belt 1, in which a package conveying direction may be one direction. If the jet head 6 shown in FIG. 3 includes multiple nozzle heads arranged in another direction perpendicular to such package conveying direction, a two-dimensional pattern for an electronic device can be formed on each of the packaged products 3 by adjusting a package conveying speed and a timing for jetting a solution including electronic function material from the jet head 6. In general, such electronic device may be formed by using a plurality of solutions including electronic function materials and by stacking a plurality of patterns one on the other. A plurality of layered patterns for electronic device can be formed if another jet head and another dry unit is set next to the jet head 6 and the dry unit 7 shown in FIG. 3, for example.

Alternatively, a plurality of layered patterns for electronic device can be formed by one set of a jet head and a dry unit. For example, if a conveyance belt system allows switching of conveying direction of a conveyance belt, a packaged product may move over a position facing the jet head a plurality of times, and a plurality of layered patterns for electronic device can be formed thereby on the packaged product.

Further, instead of using a conveying direction of a conveyance belt for forming a two-dimensional pattern for electronic device, a jet head moving system may be employed, in which a carriage holding a jet head may move over a packaged product. Such jet head moving system, used in an inkjet printer or plotter, may be preferable for forming a pattern having higher precision.

Figure 14:
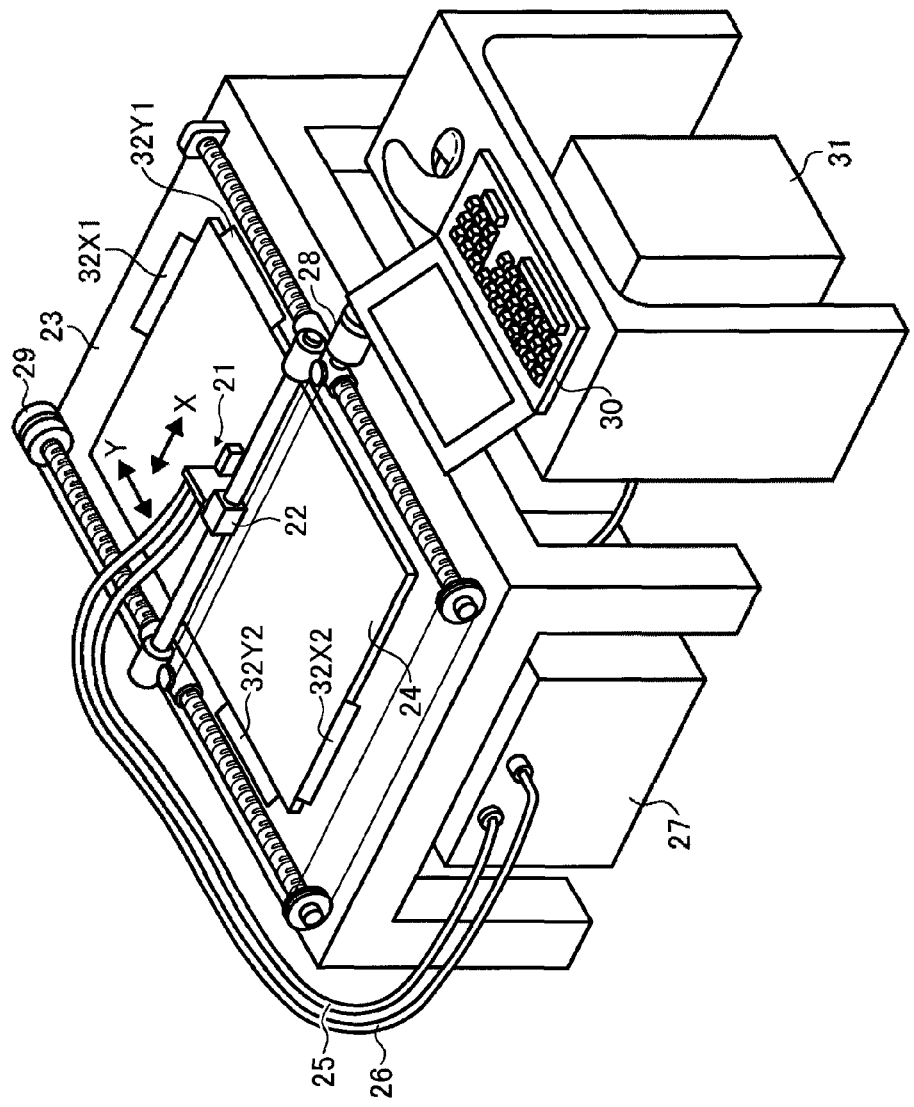
FIG. 14 illustrates a fabrication apparatus for fabricating a wiring pattern or an electronic device on a substrate, according to an exemplary embodiment of the present disclosure.

For example, FIG. 14 illustrates a fabrication apparatus for forming a wiring pattern or an electronic device according to an exemplary embodiment of the present disclosure. The fabrication apparatus includes a jet head 21, a carriage 22, a substrate holder 23, a substrate 24, a supply tube 25, a signal cable 26, a jet head control box (including a solution tank) 27, an X-direction scanning motor 28, a Y-direction scanning motor 29, a computer 30, a control box 31, and a substrate positioning/holding unit 32 (32X1, 32Y1, 32X2, 32Y2), for example. The substrate 24 may be used for forming a wiring pattern or an electronic device thereon, for example. The supply tube 25 is used to supply a solution including electronic function material from the solution tank to the jet head 21. The signal cable 26 is used to transmit signals from the jet head control box 27 to the jet head 21. The X-direction scanning motor 28 and the Y-direction scanning motor 29 are used to move the carriage 22. In such configuration, the jet head 21 is moved by scanning the carriage 22 in X/Y direction indicated in FIG. 14 when to jet a solution containing electronic function material to the substrate 24 disposed on the substrate holder 23.

Such jet head 21 held by the carriage 22 can move in X/Y direction indicated in FIG. 14, perpendicular to each other, with a higher precision, and a desired electronic device can thereby be formed on the substrate 24. Accordingly, if packaged products can be conveyed to a position, corresponding to the substrate 24, by a conveyance belt in an exemplary embodiment of the present disclosure, electronic devices can be formed on packaged products with a higher precision.

Although a configuration shown in FIG. 14 may indicate that a solution including electronic function material is jetted to packaged products conveyed on the conveyance belt in a vertically downward direction, another configuration can also be employed. For example, if a carriage, holding a jet head, shown in FIG. 14 is rotated 90 degrees clockwise or counterclockwise, such jet head may face packaged products such that a solution including electronic function material can be jetted to the packaged products from a horizontal direction. Further, if one carriage includes multiple nozzle heads arranged in one direction, a two-dimensional pattern for electronic device can be formed on packaged products.

Although an IC chip or IC sheet can be formed on packaged products with a method, an apparatus, or a system according to an exemplary embodiment of the present disclosure, such IC chip may be different from an IC or LSI fabricated on a silicon wafer with patterns having a width dimension of microns or sub-microns. In an exemplary embodiment, an IC chip may have a pattern width of 10 μm to 10 mm depending on the usage, for example, wherein such IC chip may have a relatively lower circuit integration compared to an IC formed on silicon wafer. Accordingly, an IC chip according to an exemplary embodiment can be formed on packaged products without using relatively expensive equipment used in a conventional semiconductor manufacturing process, which fabricates IC on a silicon wafer with higher precision.

In an exemplary embodiment of the present disclosure, a jet head may apply a solution including electronic function material to a substrate (i.e., package), which may be a paper or paper-based material or the like, to form an electronic device or a wiring pattern on packaged products. Such package may be a paper sheet, a corrugated cardboard, for example, but not limited thereto. If paper is used as substrate, such substrate may have surface properties, which may be attributed to cellulose fibers configuring the paper. For example, the surface of a paper may have concavities and convexities due to thickness variations of cellulose fibers and space among cellulose fibers stacked one on the other. Such concavities and convexities may not be preferable for forming a wiring pattern sheet or electronic device sheet having higher quality.

In view of such situation, in an exemplary embodiment of the present disclosure, a relationship of surface properties of paper and wiring pattern or electronic device quality was evaluated. As described above, cellulose fibers may have a thickness of 5 μm to 20 μm, in general, although thickness of cellulose fibers may vary depending on types of papers. In general, a paper manufacturing process includes a beating process for beating cellulose fibers by a beater to soften cellulose fibers. Accordingly, a paper product may be configured with cellulose fibers having a thickness that is smaller than 5 μm. Generally, a paper product manufactured with a beating process may be configured with cellulose fibers having a thickness of 4 μm to 10 μm, for example.

In view of such situation, in an exemplary embodiment of the present disclosure, a relationship between surface roughness of paper and quality of a wiring pattern or an electronic device was evaluated as follows. As described above, paper has surface properties, such as concavities and convexities, depending on the cellulose fibers and coating material, which may affect pattern formation condition. As described later, papers having different surface properties were prepared by adjusting fiber thickness, amount of coating material, and then a wiring pattern for electronic device formed on each of papers. Such wiring pattern was evaluated by sensory evaluation method and durability test of wiring pattern, wherein such wiring pattern is a straight pattern composed of a plurality of dots, superimposed one on the other by superimposing a half of one dot to the adjacent dot. Further, a sensory evaluation was conducted to evaluate a shape of dot formed on a substrate.

In such paper preparation process, a roller coating method was employed to apply a coating material on paper, in which one whole face was coated with a coating material. Although a coating material can be applied to a whole face of paper by a spray coating method, a roller coating method was employed to uniformly apply a coating material on paper. Further, although a coating material can be applied on paper with an inkjet method, a roller coating method was employed to apply a coating material on paper in a shorter time.

A wiring pattern was formed on a paper by using a jet head having a piezoelectric element, such as shown in FIGS. 5 and 6, with a nozzle plate provided on the jet head, wherein the nozzle plate was formed of nickel (Ni) with an electro-forming technique and had a thickness of 20 μm. Further, such jet head was provided with 256 nozzles and density of nozzles was set to 180 dpi (dot per inch), and each nozzle had a diameter of 20 μm (or area of 314 μm$^2$).

A solution used in an exemplary embodiment of the present disclosure was prepared as water solution including colloidal silver, which was prepared as follows.

First, DISPERBYK® 190 (BYK-Chemie GmbH, solid content ratio of 40% mass weight) of 23.3 g and ion-exchanged water of 420.5 g were put into Kolben of 2 liters. Such Kolben was placed in a water bath, and stirred at 50 degrees Celsius until DISPERBYK® was dissolved. Silver nitrate of 100 g having been dissolved into ion exchange water of 420.5 g was added thereto while being stirred, and stirred at 70 degrees Celsius for 10 minutes. Then, dimethylaminoethanol of 262 g was added thereto. The liquid quickly changed its color to black, and liquid temperature rose to 76 degrees Celsius. The liquid was left as it was. When the liquid temperature decreased to 70 degrees Celsius, it was continuously stirred at such temperature for two hours. As a result, water solution of colloidal silver colored dark yellow was obtained.

The resultant reaction liquid was transferred to a plastic bottle of 1 liter, and the bottle was left standing in a constant temperature room at 60 degrees Celsius for 18 hours. An ultrafiltering system was constructed with an ultrafiltration module AHP1010 (trade name of Asahi Kasei Corporation, molecular weight cut off of 50000, number of filters of 400), a magnet pump, and a stainless cup of 3 liters having tube connection ports at its lower part, which were interconnected to each other with silicone tube. The reaction liquid having been left standing in a constant temperature room at 60 degrees Celsius for 18 hours was put into a stainless cup, and ion exchange water of 2 liters was added to the liquid. Then, the pump was operated to perform an ultrafiltering process. After about 40 minutes, a liquid filtered by the ultrafiltering module reached 2 liters. At this time, ethanol of 2 liters was put into the stainless cup. Thereafter, it was confirmed that electric conductivity of the filtering liquid was 300 μS/cm or lower, and a concentration process was carried out until an amount of mother liquid reached 500 ml.

Subsequently, another ultrafiltering system was constructed with a 500 ml stainless cup, an ultrafiltering module ("AHP0013", trade name of Asahi Kasei Corporation; molecular weight cut off of 50000, number of filters of 100), a tube pump, and an aspirator. The mother liquid previously prepared was transferred into the stainless cup, and was concentrated to increase a solid concentration. When the mother liquid reached about 100 ml, operation of the tube pump was stopped, and at the end of the concentrating operation, a silver colloid ethanol solution having a 10% solid was obtained.

An average particle diameter of the colloidal silver particle in the solution was 0.017 μm (17 nm). The result of measurement by an instrument TG-DTA (Seiko Instruments Inc.) showed that a content of the silver in the solid was 90 mass weight % for 87 mass weight % of the charge.

Such water solution having colloidal silver was dispensed on substrates (e.g., paper) having different surface properties with the above-mentioned jet head to form a single dot, and a wiring pattern formed of a plurality of dots by superimposing a half of each dot to an adjacent dot. A dot diameter was about 40 μm to 50 μm although the dot diameter may vary depending on surface properties of substrate. An electrode pattern having a thickness of 0.5 μm was formed on each end of the substrate by sputtering aluminum (Al) in advance. The jet head was applied with a drive voltage of 30 V having drive frequency of 12 kHz for driving a piezoelectric element.

After forming such wiring pattern on a substrate, the substrate was placed in an oven to dry the wiring pattern on a substrate at a temperature of 100 degrees Celsius for 10 minutes to obtain a dried layer having a thickness of about 0.2 μm and metallic luster. An electrical conductivity of the dried layer was evaluated using surface resistivity measured with Loresta FP (Mitsubishi Chemical Corporation), and such surface resistivity was not measurable (e.g., $10^8$ Ω/sq. or more).

After irradiating a light having energy of 5 J/cm$^2$ to such dried layer with a low-pressure mercury lamp, the substrate was heated at 100 degrees Celsius for 40 minutes to obtain a metal layer. An electrical conductivity of the metal layer was evaluated using surface resistivity measured with Loresta FP (Mitsubishi Chemical Corporation) and such surface resistivity was measured as 37.6 Ω/sq.

Then, power having a pulse voltage of 30 V and a pulse width of 50 ms was applied repeatedly between the electrode patterns with a pulse interval of 100 ms for 60 minutes to evaluate whether broken wire occurs on wiring pattern as durability test.

Table 1 and Table 2 show results of such evaluation test. A dot shape was evaluated for each sample by sensory evaluation method with microscopic observation using 100 magnifications, and "O" represents acceptable and "X" represents unacceptable, wherein each evaluation was conducted with sampled twenty dots. A durability test of wiring pattern was evaluated for each sample, and "O" represents no broken wire and "X" represents broken wire occurred.

Evaluation test 1 was conducted with paper using unbeaten fiber having thickness of fibers of 6 μm to 15 μm, space among stacked fibers of 3 μm to 5 μm, and a coating material, which is a solution dispersing calcium carbonate having a particle diameter of 1 μm using starch as binder.

TABLE 1

| No. | Coating | Surface roughness (μm) | Dot shape check | Durability |
|---|---|---|---|---|
| 1 | No coating | 5-10 | X | X |
| 2 | One time coating | 2-5 | X | X |
| 3 | Two times coating | 1-2 | O | O |
| 4 | Three times coating | 1 | O | O |

Evaluation test 2 was conducted with paper using beaten fiber having thickness of fibers of 4 μm to 7 μm, space among stacked fibers of 3 μm to 4 μm, and a coating material, which is a solution dispersing calcium carbonate having a particle diameter of 1 μm using starch as binder.

TABLE 2

| No. | Coating | Surface roughness (μm) | Dot shape check | Durability |
|---|---|---|---|---|
| 1 | No coating | 3-5 | X | X |
| 2 | One time coating | 1-2 | O | O |
| 3 | Two times coating | 1 | O | O |

In the above evaluation tests, surface property such as concavity and convexity of paper used as substrate was smoothed by applying a coating material (e.g., calcium carbonate and starch), wherein the concavity and convexity of paper is determined by thickness of cellulose fibers and spaces among stacked fibers. Based on results shown in Table 1 and Table 2, when the surface roughness of paper is effectively suppressed by surface treatment, compared to a level of concavity and convexity of paper before surface treatment, a dot having preferable shape can be formed, and a broken wire may not occur to a wiring pattern, by which a wiring pattern having preferable shape and durability can be formed.

Further, in an exemplary embodiment of the present disclosure, other coating material having insulation fine particles can be used. For example, porous polyimide fine particles having surface resistivity of $10^{14}$ Ω/sq. or more prepared by adding amine catalytic agent to acid anhydride and diisocyanate, AlN fine particles having a size of 20 nm to 30 nm prepared by injecting Al particles (20 μm) to arc plasma, or SiOx fine particles prepared by gas evaporation method can preferably be used.

Although surface properties or surface roughness (e.g., 3 μm to 10 μm), such as concavity and convexity of paper used as substrate, was smoothed by applying a coating material in the above evaluation tests, such smoothing pretreatment can be omitted in some cases. In one case, if smoothness of paper can be enhanced by employing a roller-used pressure process for fabricating paper, such smoothing pretreatment can be omitted. In another case, if an electronic device is formed with dots having a relatively greater size such as 100 μm to 500 μm, which causes less broken wire, such smoothing pretreatment can be omitted. As such, a smoothing pretreatment on a paper substrate can be omitted if a pattern having an enough level of quality can be formed on a paper substrate.

A description is now given to electronic function materials usable in an exemplary embodiment of the present disclosure. A solution containing electronic function material may be prepared by dispersing conductive fine particles in a solution, and such solution is dispensed as droplet 43. For example, solutions including metal fine particles, such as Au, Pt, Ag, Cu, Ni, Cr, Rh, Pd, Zn, Co, Mo, Ru, W, Os, Ir, Fe, Mn, Ge, Sn, Ga, and/or In, are preferably used, or solutions including fine particles of metal oxide of such metals are preferably used. Particularly, a fine circuit pattern, which has lower electric resistance and higher anti-corrosion, can be obtained by employing metal fine particles, such as Au, Ag, and Cu. In an exemplary embodiment, such solutions containing conductive fine particles may be prepared as an aqueous solution and an oil solution.

For example, an aqueous solution, which includes water as a dispersant and minute conductive fine particles dispersed therein, may be prepared as below.

First, a water soluble polymer is dissolved in a metal ion aqueous solution (e.g. gold chloride, silver nitrate) and added with alkanolamine, such as dimethylaminoethanol, while being agitated. The solution is subjected to reduction of metal ions for several tens of seconds to several minutes, and metal fine particles having an average diameter of 0.5 μm (500 nm) or less is deposited. Then, chlorine ions or nitrate ions are removed by an ultrafiltration membrane, and then subjected to concentration/drying to obtain a solution containing concentrated conductive fine particles. The solution containing concentrated conductive fine particles may be effectively dissolved/mixed with water, alcoholic solution, or a binder used for a sol-gel process (e.g., tetraethoxysilane, triethoxysilane).

Further, an oil solution, which includes oil as a dispersant and minute conductive fine particles dispersed therein, may be prepared as below.

First, an oil soluble polymer is dissolved in a water miscible organic solvent (e.g. acetone) and mixed with metal ion aqueous solution. Although this mixture is a heterogeneous system, metal fine particles are extracted toward an oil phase in a manner dispersed in the polymer when alkanolamine is added while agitating the mixture. By concentrating/drying the mixture, a solution containing concentrated conductive fine particles can be obtained. The solution containing concentrated conductive fine particles can be effectively dissolved/mixed with a solvent, such as an aromatic compound, a ketone compound, or an ester compound, or a resin, such as polyester resin, epoxy resin, acryl resin, or polyurethane resin, for example.

Although the density of conductive fine particles in such solution may be a maximum of 80% by weight, the solution containing conductive fine particles is suitably diluted according to the purpose for use. In the solution containing conductive fine particles, the conductive fine particles included therein is, typically, 2% to 50% by weight, the surfactant and resin included therein is 0.3% to 30% by weight, and the viscosity thereof is 3 to 30 centipoise, for example.

By using any one of the above-mentioned materials, in an exemplary embodiment of the present disclosure, wiring patterns and electronic devices are formed by vaporizing (evaporating) volatile component in the solution so as to deposit solid content on a substrate. Such solid content may become wiring patterns or electronic devices on the substrate, and the solvent (volatile component) is used as a vehicle for dispensing the above-mentioned solution with inkjet method.

Further, a solution dispensed as droplet 43 may be, for example, any one of a I-VII group semiconductor compound, such as CuCl, a II-VI group semiconductor compound, such as CdS, CdSe, etc., a III-V group semiconductor compound, such as InAs, a semiconductor crystal of a IV group, a metal oxide, such as $TiO_2$, SiO, $SiO_2$, etc., an inorganic compound, such as a fluorescent material, fullerene, dendrimer, etc., and an organic compound, such as phthalocyanine, azo compound, or a solution including nanoparticles of composite materials of the aforementioned materials.

The nanoparticles, which can be used in an exemplary embodiment of the present disclosure, typically have a particle diameter of 0.0001 μm to 0.2 μm (0.1 nm to 200 nm) and more preferably a particle diameter of 0.0001 μm to 0.05 μm (0.1 nm to 50 nm). More particularly, the particle diameter is determined by taking into consideration some factors such as stability of dispersion of fine particles in a prepared solution, possibility of clogging during dispensing (or jetting), and surface roughness of substrate, for example.

It is to be noted that the surface of such nanoparticles may be subjected to chemical or physical processing, or an additive, such as surfactant, dispersion stabilizing agent, or antioxidant, may also be added within a scope of the present disclosure. The nanoparticles may be synthesized with, for example, a colloid chemistry method, such as a reversed micelle method or a hot THORP (thermal oxide reprocessing plant) method.

In an exemplary embodiment of the present disclosure, a solution containing nanoparticles is preferably a dispersion liquid, in which the nanoparticles are dispersed in an emulsion (O/W emulsion) where a continuous phase thereof is an aqueous phase and a dispersed phase thereof is an oil phase.

Although such aqueous phase is mainly water, a water soluble organic solvent may be added to the water. As for the water soluble organic solvent, there are, for example, ethyleneglycol, propylene glycol, butylene glycol, diethylene glycol, triethylene glycol, polyethylene glycol (#200, #400), glycerin, alkylether of the aforementioned glycol, N-methylpyrrolidone, 1,3 dimethylimidazolinone, thiodiglycol, 2-pyrrolidone, sulfolane, dimethylsulfoxide, diethanolamine, triethanolamine, ethanol, and isopropanol. The amount of the water soluble organic solvent used in the aqueous dispersion medium is preferably 30% or less by weight, and more preferably 20% by weight.

Although a range of the amount of nanoparticles included in the dispersion liquid differs depending on types of film or layer to be formed on a substrate, alignment of particles, and/or the thickness of the desired film (layer), it is preferably 0.01% to 15% by weight, and more preferably 0.05% to 10% by weight. If an amount of nanoparticle is too small, a wiring pattern or an electronic device may not have enough level of functionality, and if an amount of nanoparticle is too large, jetting stability cannot be obtained when dispensing or jetting droplets with an inkjet method.

Further, it is preferable to include a surfactant and a solvent for dispersing nanoparticles in the dispersion liquid of the solution containing nanoparticles. As for the surfactant, there are, for example, anion surfactant (e.g., sodium dodecyl sulfonate, dodecylbenzene sulfonic acid natrium, lauric acid natrium, ammonium salt of polyoxyethelenealkylethersulfate), and nonionic surfactant (e.g., polyoxyethylene alkylether, polyoxyethylene alkylester, polyoxyethylene soribitan fatty acid ester, polyoxyethylene alkylphenyl ether, polyoxyethylene alkylamine, polyoxyethylene alkylamide). Such agents may be used independently or as a mixture of two or more kinds.

A range of an amount of the surfactant in the entire solution is typically 0.1% to 30% by weight, and more preferably 5% to 20% by weight. If an amount of the surfactant is too small compared to such range, a water-oil separation in the aqueous dispersing liquid may occur, by which a pattern may not be formed or coated evenly on a substrate when droplets are dispensed. On the other hand, if an amount of the surfactant is too great compared to such range, the viscosity in the aqueous dispersing liquid may become too high, which may degrade droplet dispensing performance.

As for the solvent for dispersing nanoparticles, there are, for example, volatile liquids of toluene, hexane, pyridine, chloroform. A range of an amount of the solvent for dispersing nanoparticles is approximately 0.1% to 20% by weight, and more preferably 1% to 10% by weight. If an amount of the solvent for dispersing nanoparticles is too small compared to such range, the amount of ultra fine particles that can be included in the aqueous dispersing liquid becomes small. On the other hand, if an amount of solvent for dispersing nanoparticles is too great compared to such range, a water-oil separation in the aqueous dispersing liquid may occur.

Further, an organic compound may be dissolved in the dispersing liquid. As for the organic compound, there are, for example, trioctylphosphinoxide (TOPO), thiophenol, photochromic compound (spiropyrane, fulgide), a charge transfer type complex, and an electron accepting compound, in which the organic compound is preferably solid at room temperature. In this case, an amount of organic compound in the dispersing liquid with respect to the nanoparticles is {fraction (1/10000)} or more by weight, and more preferably approximately {fraction (1/1000)} to 10 times by weight.

It is to be noted that an additive, such as surfactant, dispersion stabilizing agent, or antioxidant, polymer, or a material that gelates in a coating/drying process may be added to the suspension within a scope of the present disclosure.

The above-described solution containing nanoparticles is jetted onto a substrate with an inkjet method and dried to form a wiring pattern or an electronic device on a substrate.

Although a thickness of thin film of nanoparticles obtained by the aforementioned method is not restricted in any particular value, such thickness of thin film usually ranges from a diameter of a nanoparticle to 1 mm, and more preferably approximately a diameter of a nanoparticle to 100 μm. Further, it is preferable for the nanoparticles in the thin nanoparticle film to be disposed in a manner exceeding a certain density. Accordingly, an average space (distance) among nanoparticles in the nanoparticle aggregate is typically no more than 10 times of the particle diameter of nanoparticles, and more preferably no more than 2 times of the particle diameter of nanoparticles. If the average space among particles is too great, nanoparticles are unable to provide a collective function.

Further, a solution dispensed as droplet 43 may be a solution including organic semiconductor material. For example, such organic semiconductor material may be n conjugated material, which may be polypyrrole, such as polypyrrole, poly(N-substituent pyrrole), poly(3-substituent pyrrole), poly(3,4-double substituent pyrrole); polythiophene, such as polythiophene, poly(3-substituent thiophene), poly(3,4-doublesubstituent thiophene), polybenzothiophene; polyisothianaphthenen, such as polyisothianaphthenen; polychenylenevinylene, such as polychenylenevinylene; poly(p-phenylenevinylene), such as poly(p-phenylenevinylene); polyaniline, such as polyaniline, poly (N-substituent aniline), poly(3-substituent aniline), poly(2,3-substituent aniline); polyacetylene such as polyacetylene; polydiacetylene, such as polydiacetylene; polyazulene, such as polyazulene; polypyrene such as polypyrene; polycarbazole, such as polycarbazole, poly(N-substituent carbazole); polyselenophene, such as polyselenophene; polyfuran, such as polyfuran, polybenzofuran; poly(p-phenylene), such as poly(p-phenylene); polyindole, such as polyindole; polypyridazine, such as polypyridazine; polyacene, such as naphthacene, pentacene, hexacene, heptacene, dibenzopentacene, tetrabenzopentacene, pyrene, dibenzopyrene, chrysene, perylene, coronene, terrylene, ovalene, quaterrylene, circumanthracene, a derivative of polyacene, such as triphenodioxazine, triphenodithiazine, hexacene-6,15-quinone prepared by substituting carbon atom of polyacene with an atom of N, S, O, or functional group, such as carbonyl group; and a polymer, such as polyvinyl carbazole, polyphenylenesulfide, polyvinylenesulfide.

Further, a solution dispensed as droplet 43 may be made of oligomer having repeating units. For example, thiophene consisting of six monomer, such as α-sexythiophene, α,ω-dihexyl-α-sexythiophene, α,ω-bis(3-butoxypropyl)-α-sexythiophene, and styrylbenzene derivative, may be used.

Further, a solution dispensed as droplet 43 may be made of a metal phthalocyanine, such as copper phthalocyanine, fluorine substituted copper phthalocyanine; naphthalene tetracarboxylic acid diimide, such as naphthalene 1,4,5,8-tetracarboxylic acid diimide, N,N'-bis(4-trifluoromethylbenzyl) naphthalene 1, 4,5,8-tetracarboxylic acid diimide; N,N'-bis(1H,1H-perfluorooctyl), N,N'-bis(1H,1H-perfluorobutyl), N,N'-dioctylnaphthalene 1,4,5,8-tetracarboxylic acid diimide derivative, naphthalene 2,3,6,7-tetracarboxylic acid diimide, and condensed ring tetracarboxylic acid diimide, such as anthracene tetracarboxylic acid diimide including anthracene 2,3,6,7-tetracarboxylic acid diimide; fullerene, such as C60, C70, C76, C78, C84; carbon nanotube, such as SWNT (single-walled carbon nanotube); and dye compound, such as merocyanine dye, hemicyanine dye, for example.

As for such n conjugated material, following compounds are preferably used: an oligomer having at least two of thiophene, vinylene, chenylenevinylene, phenylenevinylene, p-phenylene, and derivative substitution thereof as repeating unit and having 4 to 10 repeating units of these compounds; a polymer having 20 repeating units or more of these compounds; aromatic compound having condensed multiple-ring; fullerene; tetracarboxylic acid diimide having condensed ring; and metal phthalocyanine, for example.

The other organic semiconductor material that can be used for the droplet 43 may be organic molecule complex, such as tetrathiafulvalene (TTF)-tetracyanoquinodimethane (TCNQ) complex, bisethylenetetrathiafulvalene (BEDTTTF)-perchloric acid complex, BEDTTTF-iodine complex, and TCNQ-iodine complex. Further, a solution dispensed as droplet 43 may be σ conjugated polymer, such as polysilane, polygermane, for example.

An organic semiconductor material, mainly composed of polymer having a repeating unit shown as general formula (1), is preferably used in an exemplary embodiment of the present disclosure. Such organic semiconductor material and a synthetic method thereof are described.

zero or more than zero (m≧0); x represents PO(OR5)2 (R5 represents lower alkyl group) or P(R6)3+Y— (R6 represents substituted or not-substituted aryl group, or substituted or not-substituted alkyl group); and Y represents halogen atom.

Although base compounds, which can be dissolved in non-aqueous solvent uniformly, can be used for preparing an organic semiconductor material, preferably, a base compound, such as metal alkoxide, metal hydride, organic lithium compound, or the like, is used in view of alkalinity and formation of phosphonatecarbanion.

general formula (1)

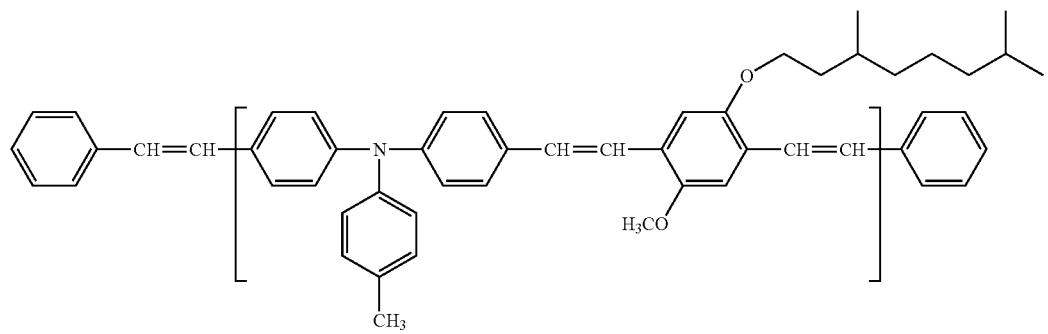

For example, carbonyl compound shown as general formula (2) and phosphorus compound shown as general formula (3) are reacted to obtain polymer having a plurality of repeating units including carbon-carbon double bond shown as general formula (4).

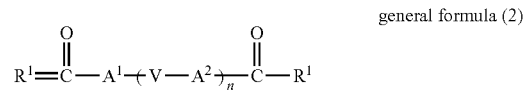

general formula (2)

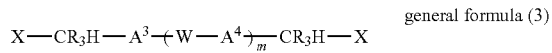

general formula (3)

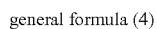

general formula (4)

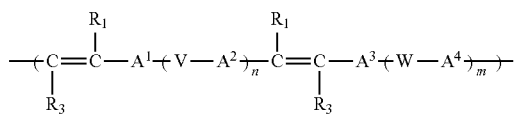

In general formula (2), A1 and A2 represent monocyclic or polycyclic of allylene group or hetero allylene group, which is substituted or not-substituted; R1 represents hydrogen, substituted or not-substituted alkyl group, and substituted or not-substituted aryl group; V represents —O—, —S—, NR2—(R2 represents monocyclic or polycyclic allylene group, which is substituted or not-substituted, or monocyclic or polycyclic hetero allylene group, which is substituted or not-substituted), and n represents zero or more than zero (n≧0).

In general formula (3), A3 and A4 represent monocyclic or polycyclic of allylene group or hetero allylene group, which is substituted or not-substituted; R3 represents hydrogen, substituted or not-substituted alkyl, aryl, or heteroaryl group; W represents —O—, —S—, —NR4—(R4 represents monocyclic or polycyclic allylene group, which is substituted or not-substituted, or monocyclic or polycyclic hetero allylene group, which is substituted or not-substituted); m represents For example, potassium t-butoxide, sodium t-butoxide, lithium t-butoxide, potassium 2-methyl-2-butoxide, sodium 2-methyl-2-butoxide, sodium methoxide, sodium ethoxide, potassium ethoxide, potassium methoxide, sodium hydride, potassium hydride, methyllithium, ethyllithium, propyllithium, n-butyllithium, s-butyllithium, t-butyllithium, phenyllithium, lithium amide, and lithium diisopropylamide can be used.

A solvent for dissolving a base compound may need to dissolve the base compound as a stable solution, and to have a good solubility of the base compound. Further, such solvent may need a property, which may not cause a degradation of solubility of a high-molecular weight compound in a reaction solvent, in which a high-molecular weight compound is formed, and such solvent may need to dissolve a resultant high-molecular weight compound effectively. Such solvent may be selected from alcohol, ether, amine, carbon hydride solvent or the like, depending on property of a base compound and a high-molecular weight compound.

Examples of solution having a base compound and a solvent solving the base compound uniformly are: sodium methoxide/methanol solution, sodium ethoxide/ethanol solution, potassium t-butoxide/2-propanol solution, potassium t-butoxide/2-methyl-2-propanol solution, potassium t-butoxide/tetrahydrofuran solution, potassium t-butoxide/dioxane solution, n-butyllithium/hexane solution, methyllithium/ether solution, lithium t-butoxide/tetrahydrofuran solution, lithium diisopropylamide/cyclohexane solution, potassium bistrimethylsilylamide/toluene solution, or the like, for example. Some of such solutions are commercially available.

From a viewpoint of mild reaction condition and easiness of handling, metal alkoxide solution is preferably used. From a viewpoint of solubility of resultant polymer, easiness of handling, reaction rate efficiency, metal t-butoxide ether solution is more preferably used, and potassium t-butoxide tetrahydrofuran solution is further preferably used.

A solution having same amount of phosphorus compound and aldehyde compound in terms of stoichiometric quantities may be mixed with a base compound solution having a base compound of two times or more of mole amount of phosphorus compound and aldehyde compound for polymerization reaction, by which a high-molecular weight polymer having a smaller range of molecular weight distribution may preferably be obtained. Although an amount of base compound may be set equal to an amount of phosphorus compound for polymerization reaction, an excess amount of phosphorus compound may be used for polymerization reaction because such excess amount may not cause problem for reaction.

Such polymerization reaction can be conducted by adding a base solution to a solution of phosphorus compound and aldehyde compound, by adding a solution of phosphorus compound and aldehyde compound to a base solution, or by adding a base solution and a solution of phosphorus compound and aldehyde compound to a reaction system at the same time. Accordingly, such solutions can be added in any order.

Such polymerization reaction may be conducted with a polymerization reaction time, set depending on reaction rate of monomer and desired molecular weight of resultant polymer. For example, a polymerization reaction time of 0.2 hours to 30 hours may preferably be set. Further, a termination agent for terminating a polymer reaction may be added to a reaction solution at any given timing, such as before starting reaction, during reaction, and after reaction.

Such polymerization reaction can be conducted without controlling a reaction temperature, but can be progressed at room temperature in a good manner. However, such reaction temperature may be increased to enhance reaction efficiency, or can be decreased to set a mild reaction condition.

A description is now given to an example of a polymer of organic semiconductor material preferably used in an exemplary embodiment. However, other polymers within a scope of the present disclosure can be also used.

A measurement of polymer was conducted as follows. A measurement of number average molecular weight (Mn), weight-average molecular weight (Mw), and molecular weight distribution (Mw/Mn) was conducted with a gel permeation chromatography (GPC), and resultant polymer was calculated as polystyrene compound based on UV (ultra violet) absorption rate and differential refractive index using monodisperse polystyrene as reference polymer.

An example of a polymer of organic semiconductor material was prepared as follows. Specifically, dialdehyde of 0.852 g (2.70 mmol), shown in chemical formula (5), and diphosphonate of 1.525 g (2.70 mmol), shown in chemical formula (6) were put in a 100 ml flask, and substituted with nitrogen, and then tetrahydrofuran of 75 ml was put in the flask. Then, dm-3 tetrahydrofuran solution of 6.75 ml (6.75 mmol) having potassium t-butoxide of 1.0 mol was dropped to the flask, and the solution was agitated for 20 hours at room temperature. Then, benzylphosphonate and benzaldehyde were added to the flask, and the solution was agitated for 2 hours and 30 minutes. Then, acetic acid of 1 ml was added to the flask to end the reaction, and the solution was washed with water. After removing solvent under a depressurized condition, residual was dissolved in tetrahydrofuran of 15 ml and methanol of 80 ml, and the precipitated and purified to obtain a polymer shown in chemical formula (7) for 1.07 g.

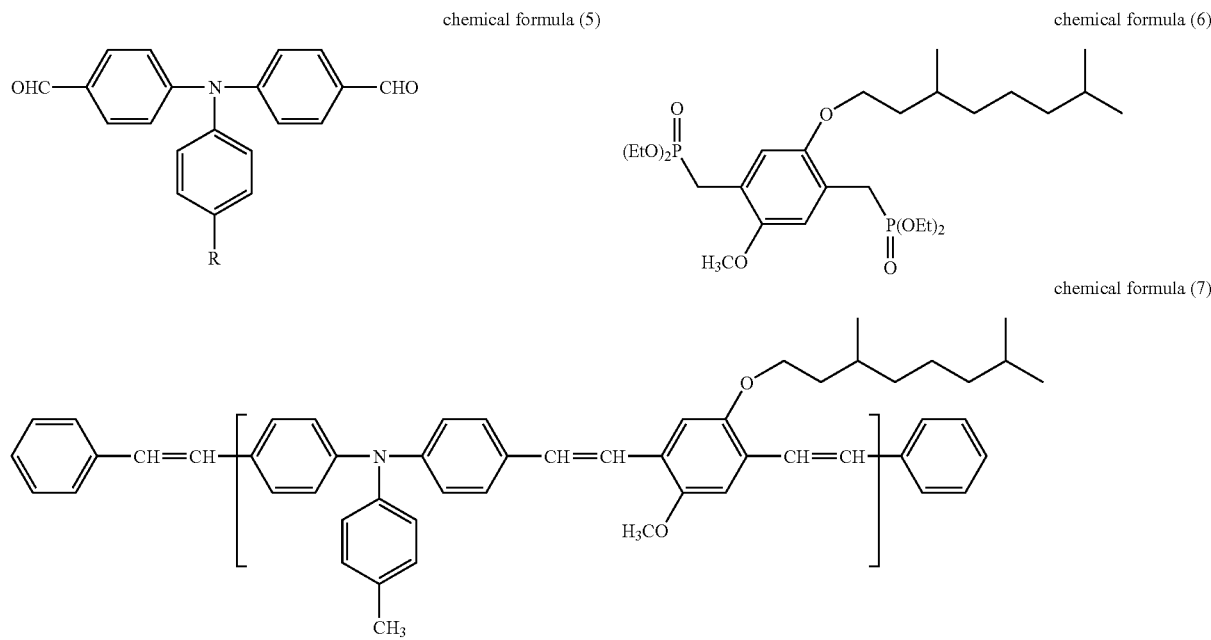

The resultant polymer, measured for molecular weight and molecular weight distribution, had a yield of 73%, a weight average molecular weight (Mw) of 104000, a number average molecular weight (Mn) of 36000, a molecular weight distribution (Mw/Mn) of 2.89, and number of repeating units of polymer of 63.

Instead of such polymer, other materials can be used as organic thin film formed on a substrate. For example, a material such as pentacene having a property that its precursor is soluble in a solvent can be applied on a substrate as a thin film using an inkjet method or the like and by applying heat treatment to such thin film.

Further, a solution dispensed as droplet 43 may be made of a precursor substance of silicon glass, used as insulation layer for semiconductor, or a material for quartz glass. Such precursor substance may be polysilazane (e.g., product of Tonen-General Sekiyu K. K.) and organic SOG (spin on glass) material, for example.

Further, an electrode may be made of material such as electrically conductive polymer having an enhanced electric conductivity by doping. For example, such electrically conductive polymer may be conductive polyaniline, conductive polypyrrole, conductive polythiophene (e.g., complex of polyethylenedioxythiophene and polystyrenesulfonic acid). Further, a solution dispersing nanoparticles (having a size of 1 nm to 50 nm) of platinum, gold, or silver may preferably be used for forming a wiring pattern and an antenna pattern for a RFID (radiofrequency identification) device, to be described later.

In an exemplary embodiment of the present disclosure, a solution dispensed as droplet 43 may include any electronic function material for fabricating a wiring pattern or an electronic device. Accordingly, such electronic function material may include conductive materials, described in this disclosure, and insulating materials.

Figure 15:
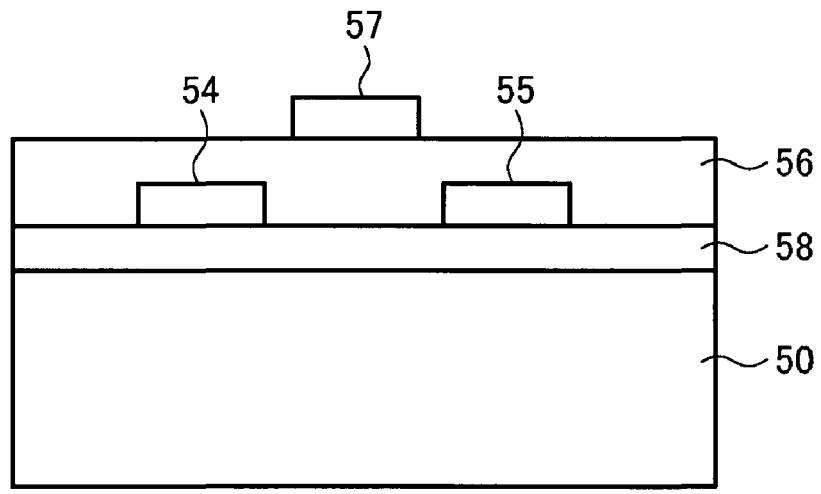
FIG. 15 illustrates a schematic cross-sectional view of an organic transistor element of top gate type fabricated by a fabrication method according to an exemplary embodiment of the present disclosure.
Figure 16:
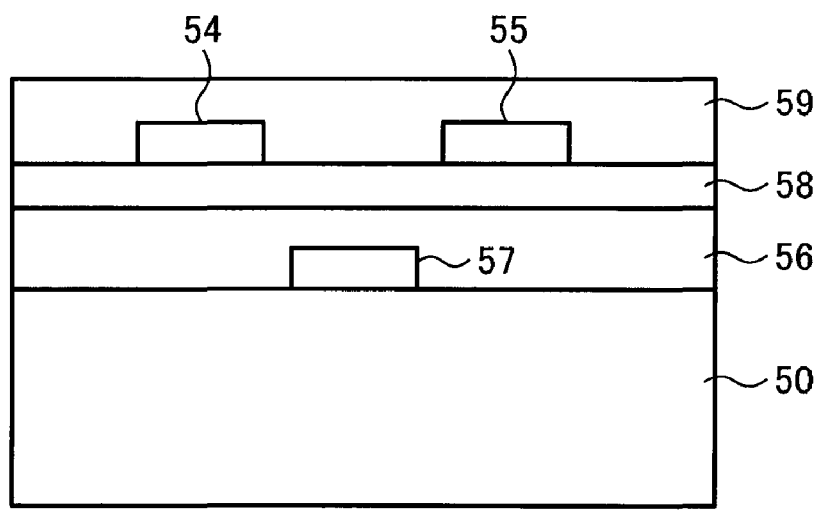
FIG. 16 illustrates a schematic cross-sectional view of an organic transistor element of bottom gate type fabricated by a fabrication method according to an exemplary embodiment of the present disclosure.

By using such solution including organic semiconductor materials or insulating materials, an organic thin film transistor shown in FIGS. 15 and 16 can be formed, for example. Such organic thin film transistor may be a top gate type or bottom gate type, for example. In case of top gate type, an organic thin film transistor includes a source electrode and a drain electrode on an organic semiconductor layer formed on a substrate, such as paper-based material, and a gate electrode is formed over the source electrode, the drain electrode, and the organic semiconductor layer via a gate insulation layer. In case of bottom gate type, an organic thin film transistor includes a gate electrode and a gate insulation layer formed on a substrate, and an organic semiconductor layer formed on the gate insulation layer, and a source electrode and a drain electrode formed on the organic semiconductor layer.

FIG. 15 illustrates an example of an organic thin film transistor of top gate type. As illustrated in FIG. 15, an organic semiconductor layer 58 is formed on a substrate 50, such as paper-based material, and a source electrode 54 (as first electrode) and a drain electrode 55 (as second electrode) are formed and electronically connected on the organic semiconductor layer 58. Further, a gate insulation layer 56 is formed over the source electrode 54, the drain electrode 55, and the organic semiconductor layer 58, and then a gate electrode 57 (as third electrode) is formed on the gate insulation layer 56, wherein the gate electrode 57 is positioned between the source electrode 54 and the drain electrode 55. A voltage is applied to the source electrode 54 and the drain electrode 55, and a voltage is applied to the gate electrode 57 for controlling a transistor.

FIG. 16 illustrates an example of an organic thin film transistor of bottom gate type. As illustrated in FIG. 16, a gate electrode 57 is formed on a substrate 50, such as paper-based material, and a gate insulation layer 56 and an organic semiconductor layer 58 are formed over the gate electrode 57 in this order. Then, a source electrode 54 and a drain electrode 55 are formed and electronically connected on the organic semiconductor layer 58, and a sealing layer 59 is formed over the organic semiconductor layer 58. A voltage is applied to the source electrode 54 and the drain electrode 55, and a voltage is applied to the gate electrode 57 for controlling a transistor.

As described above, in an exemplary embodiment of the present disclosure, an electronic device can be formed on packaged products conveyed on a conveyance belt or package substrates (e.g., paper sheet, resin film, corrugated cardboard) by jetting solutions including electronic function materials to the packaged products or package substrates. Such electronic device may be a RFID (radio frequency identification) device, for example.

The RFID device may include a memory, an electronic circuit, and a compact-sized antenna. Such memory may be SRAM (static random access memory), EEPROM (electrically erasable and programmable read only memory), FeRAM (ferroelectric random access memory), or the like. A memory type to be used is determined based on factors such as running cost. For example, in an exemplary embodiment of the present disclosure, it is preferable to use a RFID device having reduced cost because such RFID device attached to packaged products may be discarded with packages when packaged products are delivered to given destinations and a memory may not need to have a greater capacity considering a usage of such RFID device. Accordingly, an EEPROM or FeRAM, which have a memory capacity in a range of a hundred bytes to several kilo bytes and do not need a power supply for storing information or data, may preferably be used, for example. The RFID device may employ an electromagnetic induction type data transmission over a given transmission distance such as one meter, for example.

Figure 17:
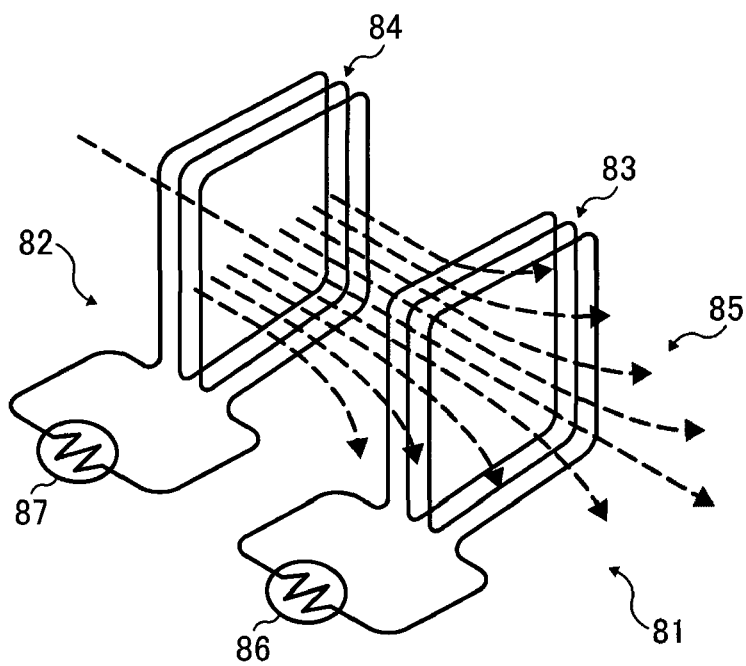
FIG. 17 illustrates a schematic view for explaining a fundamental of RFID device.

A description is given to an example of a method of data transmission of a RFID device with reference to FIG. 17, in which a RFID 81 and a reader/writer 82 are shown. As shown in FIG. 17, the RFID 81 includes a loop coil antenna 83, and the reader/writer 82 includes a loop coil antenna 84, in which a magnetic flux 85 is generated between loop coil antennas 83 and 84. The reader/writer 82 may emit a transmission signal 87, and the RFID 81 may receive a receiving signal 86.

In data transmission in the example of FIG. 17, which uses electromagnetic induction, the loop coil antenna 84 of the reader/writer 82 and the loop coil antenna 83 of the RFID 81 may be faced and distanced each other within a given range such as one meter range. A signal current having a frequency of 135 kHz or less (e.g., about 100 kHz) or 13.56 MHz may be applied to the reader/writer 82 to generate an induction field around the loop coil antenna 84 so that power/information can be transmitted with such induction field. Such induction field may have good level of intensity even in a usage environment that is not good, and thereby a data transmission can be conducted reliably.

Figure 18:
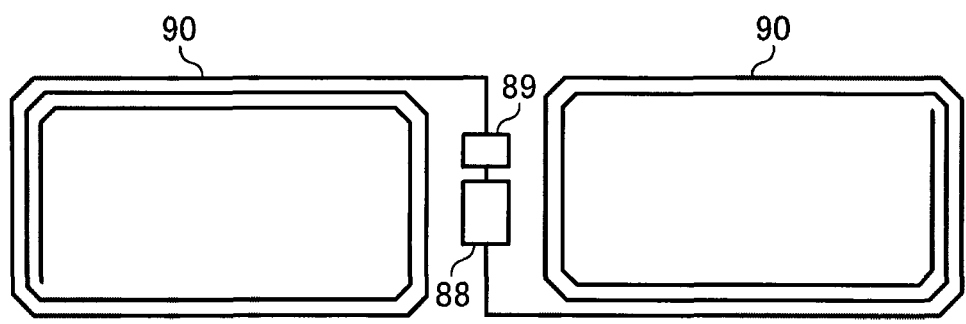
FIG. 18 illustrates a schematic view of an example of a RFID device formed on a packaged product by a system according to an exemplary embodiment of the present disclosure.

Further, because the reader/writer 82 may have relatively wider directional characteristics, such RFID 81 and reader/writer 82 may preferably be used for a conveyance system (or transport system) in an exemplary embodiment of the present disclosure. Although the loop coil antenna 83 of the RFID 81 is illustrated having a three dimensional structure in FIG. 17, such loop coil antenna 83 can be formed two-dimensionally by using a jet head in an exemplary embodiment. Such RFID 81 having integrated circuits can be formed on a substrate by stacking different patterns one on the other, which are formed by jetting solutions including different electronic function materials, wherein such process can be conducted with a given printing technique as described above. FIG. 18 illustrates a plan view of an example of a RFID device formed with a method according to an exemplary embodiment, in which the RFID device includes an electronic circuit 88, a memory 89 and an antenna 90.

Conventionally, a RFID chip is manufactured by combining an electronic circuit and an antenna, which are first separately prepared as an electronic circuit, manufactured by a semiconductor manufacturing process, and an antenna or the like, manufactured by another process.

On the other hand, in an exemplary embodiment of the present disclosure, a RFID device can be formed on a substrate such as corrugated cardboard by using a given printing process, which can form RFID device at reduced cost. Because a RFID device can be formed on a packaging member such as corrugated cardboard, paper sheet, resin sheet, directly with a printing process using jetting technique, a commercial or industrial value of such package member may be enhanced. For example, such RFID device can be used to store history information or traceability information of commercial goods. Further, because such RFID device is directly formed on a package by using a printing process, such electronic device may be removed only when the package is broken or destroyed, and may be used as deterrence for data tampering or the like. Further, a RFID device can be manufactured by combining a RFID chip, manufactured from silicon wafer, and an antenna formed on a packaging member with the above-described printing process and connected to the RFID chip.

As described above, a RFID device can be formed on a packaged products conveyed on a conveyance system (or transport system) using the jet head 6 shown in FIG. 3, or a RFID device can be formed on a packaging member by using the above-described printing process before such packaging member is used for packaging a product.

As described above, a RFID device has a functionality preferably used for a logistic or delivery system. However, such RFID device attached on packaged products may be used in adverse environments. For example, a RFID device may be exposed to wind and weather, direct sunlight, contacting other products, clashing, impact shock, vibration, which may cause damage or malfunction to the RFID device. In view of such adverse environments, a RFID device formed on packaged products may be covered or laminated with a resin film to protect the RFID device in an exemplary embodiment of the present disclosure. Such resin film may be made of polyvinyl chloride resin, polypropylene resin, or the like, for example. Further, polypropylene resin, known as environment friendly high-polymer resin materials, may be used as resin film. Further, an ultraviolet absorber such as fine particles of titanium oxide or zinc oxide is preferably added to such resin materials, for example, to suppress an effect of ultraviolet ray.

Further, such resin film may be formed over a RFID device by jetting a solution including protecting agent such as resin to a face having the RFID device by using the covering agent attaching unit 8. In this case, a wax material, which can melt at a higher temperature and can solidify at an air temperature such as 40 degrees Celsius or less, can be used. Further, such resin film may be formed over a RFID device by using a roller coating method. With such protecting agent, a RFID device formed on packaged products can be used reliable manner with respect to water resistant, impact resistance, sun proof, contamination resistance, insulation performance, or the like.

Further, a reliability of a RFID device may be enhanced by forming a plurality of electronic devices on one packaged product. RFID devices can easily be formed on a surface of paper or the like having a relatively rough surface, as described above, and such RFID devices may have a lower yield and lower quality compared to an IC or LSI formed on a silicon wafer. In view of such condition, a plurality of electronic devices may be formed on a packaged product while distancing each of the electronic devices. Because electronic devices can be formed on a packaged product with an inkjet method, there is no substantial difference in device forming time between forming one electronic device and forming a plurality of electronic devices. If a plurality of electronic devices are formed on a packaged product, product information or data stored in electronic devices can be reliably attached to the packaged product during a logistic or delivery process even if some electronic devices malfunction. For example, electronic devices formed on a poor-conditioned surface of one packaged product may be substituted by electronic devices formed on a good-conditioned surface of the same packaged product, or damaged electronic devices may be substituted by not-damaged electronic devices if a plurality of electronic devices are formed on a packaged product.

A description is now given to anther aspect of the present disclosure. As described above, an electronic device such as RFID can be formed on a surface of a package member (e.g., paper) used for a packaged product with an inkjet method.

In some cases, such electronic device may be used for handling a packaged product in a relatively short period of time after forming such electronic device on the packaged product, and in another case, such electronic device may be used for handling a packaged product in a relatively longer period of time after forming such electronic device on a packaged product. For example, packaged products may be deposited in a warehouse for several months before actually handled by a logistic system or the like. Therefore, a time lag may occur between a device forming timing and a device using timing.

Such time lag may affect a functionality of electronic device in some cases. Although electronic devices formed with a method according to an exemplary embodiment of the present disclosure, in some instances, may not have a battery therein as a power source, such electronic devices can include a battery therein as a power source depending on needs of electronic devices. If an electronic device embedded with a battery may not be used for a long period of time after forming such electronic device on a packaged product (e.g., deposited in a warehouse for several months), such electronic device may not be effectively used when such electronic device actually needs to be used due to a power consumption during such unused time period.

In view of such time lag effect of electronic devices, a redundant conductive pattern may be included in an electronic device when forming an electronic device on a packaged product or a package member. Such redundant conductive pattern may be used to prevent a functionality loss (e.g., power loss of battery) of electronic device. In other words, unless such redundant conductive pattern is cut, an electronic device is not activated, and when a wiring connection of such redundant conductive pattern is cut, the electronic device can be activated.

Further, such redundant conductive pattern may also be included in an electronic device having no battery. In this case, the redundant conductive pattern may function to maintain an electronic device in a deactivated condition. In other words, as long as the redundant conductive pattern is in intact, the electronic device may not communicate data or information with other devices (e.g., information reader), and when the redundant conductive pattern is cut, the electronic device may be able to communicate data or information with other devices.

Accordingly such redundant conductive pattern may function as a switch for activating a functionality of the electronic device. Once the electronic device is activated by cutting a wiring connection of such redundant conductive pattern, such electronic device can be used for information transmission or reception, used for managing packaged products.

Further, because an electronic device is not activated when such redundant conductive pattern is intact (e.g., no cut), data or information stored in the electronic device cannot be read in such condition, which may enhance information security.

Such redundant conductive pattern may be formed in a given position of an electronic device so that such redundant conductive pattern may not cause any problem to a functionality of electronic device when such redundant conductive pattern is cut.

Such wiring connection can be cut by a string-like member embedded in a package member (e.g., paper), in which a redundant conductive pattern may be formed over the string-like member. When an electronic device is to be used, such string-like member is torn off so that a wiring connection of a redundant conductive pattern is cut.

Alternatively, such wiring connection can be cut by a plastic tape adhered on a surface of a package member wherein a redundant conductive pattern may be formed on the plastic tape. When an electronic device is to be used, such plastic tape is peeled off so that a wiring connection of a redundant conductive pattern is cut. Alternatively, such wiring connection can be cut by breaking a perforated line formed on a package member when to use an electronic device.

Alternatively, when an electronic device is to be used, such wiring connection may be cut by a knife or the like. With such configuration, a time lag between device forming and device use may not cause a problem for using an electronic device.

In addition, an electronic device may need to be destroyed after using the electronic device to prevent data leakage or data tampering from the used electronic device. In such case, the above-mentioned string-like member, tape, perforated line or the like, can be also used. For example, if a string-like member, a tape, a perforated line is formed with an electronic device, the electronic device can be easily destroyed by pulling off the string-like member, peeling off the tape, breaking a package along the perforated line, or by cutting with a knife, for example.

A description is now given to another aspect of the present disclosure. In an exemplary embodiment, electronic devices such as RFID, storing specific information, are formed on packaged products so that packaged products can be delivered to a given destination. Such specific information is stored in an electronic device as electronic information.

Such electronic information may have a preferable aspect from a viewpoint of security because such electronic information is not visible by a human eye, and also have an unpreferable aspect from a viewpoint of viewability. For example, if someone needs to know some information for handling products quickly, a human eye cannot recognize such information in an electronic device. In view of such information viewability issue, packaged products may include electronic devices such as RFID, storing specific information in electronic form, and viewable information such as text, corresponding to the specific information stored in the electronic devices, on a surface of packaged products, for example, depending on a need of product handling.

For example, if a package member may be a thermosensitive paper, or if thermosensitive paper seal is attached on a packaged product, specific information such as production date, delivery address information, expiration date, or the like, can be written on the thermosensitive paper as visible text with a thermal head. Further, such viewable information (e.g., text) can be attached on a packaged product by jetting a liquid with a jet head using an inkjet method.

Information attached as viewable information may be selected from given specific information stored in an electronic device depending on types of information. For example, delivery address information of a packaged product and expiration date of fresh foods may be attached on a packaged product as viewable information.

Further, such viewable information may not be necessary expressed as letters or numbers but may be expressed as signs, symbols or figures, wherein such signs, symbols or figures, prepared by a given rule, may be visible but readable by only relevant persons. Such method may be useful to secure a given level of information confidentiality and viewability, required for handling packaged products, at the same time.

In this disclosure, such viewable information may include any information that can be recognized by human eye, a detector, or the like. In some case, such viewable information may not be visible under sunlight but may become visible under a given condition (e.g., UV irradiation). Accordingly, viewable information may include any information that can be recognized by human eye or a detector.

The above-described method for attaching viewable information may have some good aspects. For example, a handling person can recognize misdelivery of packaged products by seeing such viewable information, or can recognize an expiration date of fresh foods in one glance.

Although an electronic device is formed on a packaged product to attach information required for packaged products, other methods can be employed for attaching information to packaged products.

For example, a barcode system having a barcode and a photoscanner may be used for attaching specific information to a packaged product, in which a one-dimensional barcode, a two-dimensional code (stacked or matrix type), a two-dimensional symbol, or the like, may be attached on a surface of a package member with a jet head using an inkjet method. Such two-dimensional code or two-dimensional symbol can include a large amount of information compared to a string of letters/numbers used as identification information. Accordingly, such two-dimensional code may be used as backup information for an electronic device such as RFID device storing given information. Such code information can be read by a photoscanner, designed for reading code information, a digital camera, and a cell phone having camera, or the like, but not limited thereto. Further, a conveyance system (or transport system) according to an exemplary embodiment of this disclosure, can be provided with a mobile handy scanner having a camera or the like to read information attached on packaged products.

The above-described viewable information including two-dimensional code and two-dimensional symbol can be attached on packaged products with a jet head using an inkjet method. Such jet head may dispense ink, used for inkjet recording apparatus, which includes an aqueous or oil-based solvent dispersed with colorant (e.g., dye, pigment, etc.). From a viewpoint of anti-weatherability and sun proofness of ink material, pigment ink, which hardly fades, may preferably be used.

In an exemplary embodiment of the present disclosure, a solution including electronic function material is jetted on a package product with a jet head to form an electronic device on the package product. Such jet head can be also used for forming the above-described viewable information including two-dimensional code and two-dimensional symbol. By using a common jet head for jetting different solutions, a system for attaching information to package products can preferably be simplified. Further, a solution including electronic function material can also be used for the above-described viewable information including two-dimensional code and two-dimensional symbol. Because the solution including electronic function material may have a given color, such solution may also be used for forming the above-described viewable information, two-dimensional code, or two-dimensional symbol. Therefore, a solution including electronic function material may used for forming electronic devices and also used for forming viewable information, two-dimensional code, or two-dimensional symbol.

Alternatively, another ink, which is not visible for human eye under a visible light range or natural light, may be used. For example, UV fluorescence ink, visible under ultraviolet light or black light irradiation, can be used. If such UV fluorescence ink is used for forming viewable information, two-dimensional code, or two-dimensional symbol, information confidentiality can be enhanced because such UV fluorescence ink may not be visible under natural light.

Alternatively, thermochromic ink may be used as another ink for attaching information on a surface of packaged products. The thermochromic ink may change its color from red to terra-cotta color, from purple to pink, from black to blue, for example, with moist heating process. Because the thermochromic ink can change its color with an effect of heat, it can be checked whether a packaged product is affected by heat or not. Further, if such thermochromic ink may be used for packaged products susceptible to heat (e.g., fresh food), such color change can be used for checking a degradation of products itself, for example.

Alternatively, magnetic ink may be used as another ink for attaching information on a surface of a packaged product. In this case, attached information formed of magnetic material may be simply detected by a magnetoresistive sensor or detector, or shape of letters printed by magnetic ink may be read in detail magnetically, for example. Further, a magnetic stripe, which can magnetically store a large amount of information, may be attached and formed on a packaged product with a jet head using an inkjet method.

The above-described viewable information, magnetically stored information, or the like, may be termed as added-information because such information may be attached to packaged products in addition to an electronic device.

The above-described methods for attaching information on a packaged product may be selected depending on factors such as usage of product, types or amount of required information, or the like.

In an exemplary embodiment of the present disclosure, packaged products may be formed with an electronic device such as RFID thereon to use such electronic device for managing logistic or delivery system of goods, and may be further formed with viewable information (e.g., visible under natural light or under specific light) thereon. When such viewable information is attached on packaged products with a jet head using an inkjet method, a positional relationship between the jet head and packaged products may need to be adjusted with a higher precision as similar to a case forming electronic device such as RFID on packaged products.

Such positional adjustment may be conducted by the guide member 4, which was described above with reference to FIG. 3. The guide member 4 may be used for adjusting a positional relationship between the jet head and packaged products with a higher precision to form an electronic device on each of the packaged products with a higher precision. Accordingly, after forming electronic devices on packaged products, the packaged products may be aligned along a given position with a higher precision, and thereby such positional relationship can be used for attaching viewable information such as letters, symbols or signs on packaged products. Therefore, the guide member 4 may be used for adjusting a relationship between the jet head and packaged products with a higher precision for forming electronic devices and the above-described viewable information on packaged products with a higher precision. Alternatively, another guide member for adjusting a positional relationship between the jet head and packaged products may be disposed along a conveyance line in addition to the guide member 4.

As described above, an electronic device formed on packaged products may be covered or laminated with a resin film or the like to protect the electronic device from wind and weather, direct sunlight, contacting other products, clashing, impact shock, vibration, and other conditions that may cause damage or malfunction to the electronic device. Because the viewable information such as letters or signs may also be exposed to wind and weather, direct sunlight, contacting other products, or the like, it is also preferable to cover or laminate such viewable information with resin material having ultraviolet screening function as similar to the electronic device.

As described above, a conveyance system (or transport system) according to an exemplary embodiment of the present disclosure may include a conveyance unit for conveying packaged products, packaged with package member, an alignment unit for adjusting a position of packaged products conveyed or transported in a given direction, and a device attaching unit for attaching electronic functional devices on packaged products, wherein the alignment unit and device attaching unit may be disposed at positions along a conveyance route of the conveyance unit. Such conveyance system may be usefully integrated in a uniform management system, which manages products such as inventory management of industrial products or agricultural products using a computer system.

Further, in such conveyance system (or transport system), an electronic functional device is formed on a package product by jetting a solution including electronic function material to the package product with a jet head using an inkjet method and depositing solid content in the solution on the package product, by which an electronic functional device can be formed on the package product with a printing process, which uses relatively simple process and can be conducted with a relatively lower cost.

Further, in such conveyance system, a pretreatment material may be applied on a surface of a package member before jetting a solution including electronic function material on the surface of a package member, and an electronic functional device having a given pattern can be formed with higher precision and such electronic functional device may have a higher durability by avoiding breakings in a wire.

Further, in such conveyance system, a dry unit is disposed at a position, which is next to the device attaching unit, along a conveyance route to dry a solution jetted on packaged products, and an electronic functional device formed on a surface of a package member may be dried with a shorter time, and thereby such dried electronic functional device may not be damaged even if some objects contact the electronic functional device formed on a surface of a package member.

Further, the dry unit may be configured to locally heat a surface of a package member, which bears a solution including electronic function material, and thus the dry unit may consume less energy for drying the solution to form an electronic functional device, which is preferably for saving energy. Further, such localized heating may be preferable for packaged products susceptible to heat (e.g., fresh foods) because heat damage to products can be suppressed or prevented.

Further, because the electronic functional device may be a RFID device, the above-described conveyance system may be integrated usefully in a uniform management system, which manages products such as inventory management of industrial products or agricultural products, using a computer system. For example, when industrial products or agricultural products having such RFID device are conveyed or sorted on a conveyance belt, conditions of packaged products can be traced by using RFID device, or when packaged products are delivered with a logistic system, a location of packaged products may be checked by using RFID device. Further, such uniform management system may be used to manage sales data at retail stores or the like.

Further, because the above-described electronic functional device can be covered with a resin film or the like, such electronic functional device may not be damaged by adverse environment, such as wind and weather during the transport/delivery process, which is preferable for protecting data stored in the electronic functional device. Further, because the electronic functional device can be covered with material that can block ultraviolet light, such electronic functional device may not be damaged or degraded by direct sunlight. Further, because the conveyance system includes an information writer, disposed at a position along a conveyance route, to write specific information or data to a RFID device, such as on industrial products or agricultural products, a logistic system for handling products can preferably be enhanced with information technology.

Further, because the conveyance system (or transport system) can include an information reader, disposed at a position along a conveyance route, to read specific information or data of a RFID device when such information or data is stored by the RFID device, a logistic system for handling products can preferably be enhanced with information technology.

Further, because the conveyance system can also be configured with a subsystem for attaching viewable information such as letters, symbols, signs, or the like, on packaged products or goods, corresponding to electronic information stored in an electronic function device, such viewable information may have facilitate a checking process of packaged products. For example, a handling person can recognize misdelivery of packaged products when seeing such viewable information, or can recognize an expiration date of fresh foods in one glance. Further, because such viewable information can be attached directly on a surface of a package member with a jet head using an inkjet method, such viewable information, such as corresponding to electronic information stored in an electronic function device, can be easily attached to packaged products.

Further, a solution including electronic function material can be jetted on a package product with a jet head to form an electronic function device on the package product. Such jet head can also be used for forming the above-described viewable information, which may preferably simplify a system for attaching information to package products.

Further, because thermochromic material, which can change its color with an effect of heat, can be applied on a packaged product, it can be checked whether a packaged product is affected by heat or not by checking a present color of thermochromic material. Further, because UV fluorescence ink, which is not visible for human eye under a visible light range or natural light but becomes visible under ultraviolet light or black light irradiation, can be used for attaching the above-described viewable information on a surface of a package member, and information confidentiality can be enhanced.

Further, because the viewable information such as letters, symbols or signs may also be covered or laminated with a cover member such as resin film, such viewable information may not be damaged by adverse environment such as wind and weather during transport/delivery process, which is preferable for protecting information or data of the viewable information.

Further, because information scannable by a photoscanner or the like can be attached to a surface of a package member of a packaged product, in addition to an electronic device formed on a packaged product, with an jet head using an inkjet method, packaged products can be attached with information relevant for transporting/delivering products with a plurality of methods. For example, information scannable by a photoscanner may be a barcode such as one-dimensional barcode, a two-dimensional code (stacked or matrix type), a two-dimensional symbol or the like, wherein such information can be read by a photoscanner designed for reading code information, a digital camera, a cell phone having camera or the like, but not limited thereto.

Further, information can be attached on a surface of a packaged product, by jetting a magnetic material on a surface of a package member with a jet head using an inkjet method and storing information on a magnetically recordable area formed on a surface of a packaged product, in addition to an electronic function device such as RFID device, by which the above-described conveyance system can enhance its functional extendability.

Further, because the above-described viewable information, scannable information, or magnetically recordable information can be configured to a part of the information stored in the electronic function device such as RFID device, such viewable information, scannable information, or magnetically recordable information can be used as backup information if electronic information stored in the RFID device is lost by accident, and such backup information may be read by a corresponding reader so that a system down for logistic or the like can be avoided, and a system reliability can be enhanced.

Further, because an alignment unit for adjusting a positional relationship between the jet head and packaged products with a higher precision may be disposed along a conveyance line in the above-described conveyance system (or transport system) before attaching any one of the above-described viewable information, scannable information, and magnetically recordable information, packaged products may be attached with the above-described viewable information, scannable information, or magnetically recordable information with a higher precision, and information can be recognized with a higher precision, which is preferable for suppressing or preventing malfunction in information reading such as when the information is misread or cannot be read.

Numerous additional modifications and variations are possible in light of the above teachings. It is therefore to be understood that within the scope of the present disclosure and appended claims, the subject matter of the present disclosure may be practiced otherwise than as specifically described herein. For example, elements and/or features of different examples and illustrative embodiments may be combined each other and/or substituted for each other within the scope of this disclosure and appended claims.

This disclosure claims priority from Japanese Patent Application No. 2006-356578, filed on Dec. 28, 2006 in the Japan Patent Office, the entire contents of which are incorporated herein by reference.

What is claimed is:

1. A conveyance system, comprising:
   a conveying unit configured to convey individual packages along a conveyance route, each package packaging an object;
   an attaching unit configured to attach at least one radio frequency identification device to each of the packages, the attaching unit including a jet head for jetting a solution including electronic function material to a surface of each of the packages by using an inkjet method, and the radio frequency identification device is formed on each of the objects by depositing a solid content of the solution on each of the packages;
an alignment unit disposed before the attaching unit along the conveyance route of the conveying unit and configured to align the packages to a reference position relative to the attaching unit as the packages are conveyed by the conveying unit; and
a dry unit configured to dry at least the solution jetted to the packages but less than a whole of the packages, the dry unit being disposed downstream of the attaching unit along the conveyance route.

2. The conveyance system according to claim 1, further comprising a pretreatment unit configured to apply a pretreatment material to a surface of the packages before the solution including electronic function material is jetted to each of the packages.

3. The conveyance system according to claim 1, wherein the dry unit dries a specific local area of the packages, onto which the solution including electronic function material is jetted.

4. The conveyance system according to claim 1, further comprising a covering unit configured to cover the radio frequency identification device with a covering member.

5. The conveyance system according to claim 4, wherein the covering member includes a material which blocks ultraviolet light.

6. The conveyance system according to claim 1, further comprising a writer configured to write information to the radio frequency identification device, the writer being disposed in a downstream of the attaching unit along the conveyance route.

7. The conveyance system according to claim 6, further comprising a reader configured to read the information stored in the radio frequency identification device.

8. The conveyance system according to claim 1, wherein each of the packages is attached with added-information including any one of character, sign, and symbol and a combination thereof by using an inkjet method.

9. The conveyance system according to claim 8, wherein the added-information is viewable information attached on each of the packages and the viewable information is formed by jetting through said jet head a solution having any one or more of a visible coloring agent, a visible coloring agent including electronic function material, a visible coloring agent including thermochromic material which changes colors with an effect of heat, an ultraviolet fluorescence material, which emits light with irradiation of ultraviolet ray on each of the packages.

10. The conveyance system according to claim 8, wherein the added-information is covered by a covering member.

11. The conveyance system according to claim 8, wherein the added-information is information scannable by a photo-scanner.

12. The conveyance system according to claim 8, wherein the added-information is formed with a magnetic material, which is magnetically recognizable.

13. The conveyance system according to claim 8, wherein the added-information is magnetically stored in a magnetically recordable area formed on each of the packages by jetting through said jet head a solution including a magnetic material on each of the packages by using an inkjet method.

14. The conveyance system according to claim 8, wherein the added-information includes a part or all of information written in the radio frequency identification device.

15. The conveyance system according to claim 1, further comprising:
an information writing unit configured to write information to the at least one radio frequency identification device attached to each of the packages,
an information reading unit configured to read the information from the at least one radio frequency identification device attached to each of the packages, and
a sorting unit configured to sort the packages based on the information written to or read from the radio frequency identification devices attached to each of the packages.

16. The conveyance system according to claim 1, wherein the conveyance unit is configured to switch a conveyance direction of each package along the conveyance route to convey each package over a position facing the attaching unit a plurality of times.

17. The conveyance system according to claim 1, further comprising:
a second attaching unit comprising a jet head configured to jet a solution to a surface of each package to form a visible or magnetically readable added-information pattern; and
a second alignment unit disposed before the second attaching unit along the conveyance route of the conveying unit and configured to align the objects to a reference position relative to the second attaching unit as the packages are conveyed by the conveying unit.

\* \* \* \* \*